US008195367B2

(12) United States Patent
Kim et al.

(10) Patent No.: US 8,195,367 B2
(45) Date of Patent: Jun. 5, 2012

(54) LEVELING CONTROL SYSTEM AND METHOD FOR HEAVY EQUIPMENT

(75) Inventors: Jin Seop Kim, Changwon-si (KR); Chang Soo Lee, Changwon-si (KR); In Woo Kim, Changwon-si (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 667 days.

(21) Appl. No.: 12/326,375

(22) Filed: Dec. 2, 2008

(65) Prior Publication Data

US 2009/0151483 A1    Jun. 18, 2009

(30) Foreign Application Priority Data

Dec. 12, 2007    (KR) .................. 10-2007-0129044

(51) Int. Cl.
*G06F 7/70* (2006.01)
*G06F 19/00* (2006.01)
*G06G 7/00* (2006.01)
*G06G 7/76* (2006.01)
*G01D 5/00* (2006.01)

(52) U.S. Cl. ............... 701/50; 37/413; 37/414; 37/415; 37/416; 37/907; 414/698; 414/699; 414/700; 414/701; 172/4.5

(58) Field of Classification Search ............... 701/50; 404/85, 90; 180/209; 280/43, 43.24; 37/411–417, 37/907; 172/1–12; 414/680, 696–706
See application file for complete search history.

(56) References Cited

U.S. PATENT DOCUMENTS 7,077,601 B2 * 7/2006 Lloyd .......................... 404/85

* cited by examiner

*Primary Examiner* — Christopher J. Novosad
(74) *Attorney, Agent, or Firm* — Ladas & Parry LLP

(57) ABSTRACT

A leveling control system and method for heavy equipment, in which a lower frame having a traveling unit and an upper frame are combined together by a tilting unit. The system includes a sensor unit, provided in the equipment, for measuring twist angles of the lower frame and the upper frame against a reference horizontal surface and a traveling speed of the equipment, and detecting working state information of working devices; a control unit for receiving the twist angles, the traveling speed, and the working state information, calculating a correction angle for the leveling control of the upper frame, and generating a control signal for instructing an operation of an actuator in accordance with the correction angle; and a driving unit for performing the leveling through the actuator in accordance with the control signal received therein. The control unit is provided with an auto leveling mode module for performing the leveling against a reference horizontal surface, a re-leveling mode module for performing the leveling against the reference horizontal surface in a standstill state of the equipment for a limited time, and a track leveling mode module for performing the leveling against the lower frame.

7 Claims, 17 Drawing Sheets

LEVELING CONTROL SYSTEM AND METHOD FOR HEAVY EQUIPMENT

CROSS-REFERENCE TO RELATED APPLICATION

This application is based on and claims priority from Korean Patent Application No. 10-2007-0129044, filed on Dec. 12, 2007 in the Korean Intellectual Property Office, the disclosure of which is incorporated herein in its entirety by reference.

BACKGROUND OF THE INVENTION

1. Field of the Invention

The present invention relates generally to a leveling control system and method for heavy equipment, and more particularly to a leveling control system and method for heavy equipment in which a lower frame having a traveling means and an upper frame having working devices and a cab are coupled to each other through a tilting means, which can automatically or manually perform a leveling of the upper frame through the tilting means.

2. Description of the Prior Art

In heavy equipment, such as an excavator, a logging device, a crane, and the like, which is working on an inclined site, an upper frame is inclined to a horizontal surface depending on the ruggedness of ground.

When the heavy equipment is in an inclined state, inclination of an upper frame to a horizontal surface is changed as the upper frame is swiveled, and this causes the work to be done in an unstable state of the equipment. Also, as the center of gravity of the equipment is moved, a danger of overturning of the heavy equipment is increased.

In order to solve this problem, a method of moving the center of gravity of the heavy equipment near to ground through tilting of an upper frame on an inclined site has been used.

As a recent technology related to the above-described method, U.S. Pat. No. 6,609,581 discloses a tilt mechanism having an upper support being supported and tilted by two hydraulic cylinders.

Also, U.S. Pat. No. 6,158,539 discloses two hydraulic cylinders, upper bearing body support plate coupled to a center tilt shaft, and a lower plate.

As such tilting means is complicated, it is required that a user has a good experience in manually controlling the tilting through an expansion/contraction adjustment device of hydraulic cylinders with recognition of mutual relations among respective hydraulic cylinders, and thus it is not easy for a user to properly perform the tilting control.

Also, in the case where an operator manually controls the tilting of the heavy equipment as the equipment is moving in a rugged area, the operator should manipulate the leveling simultaneously with driving of the equipment. Accordingly, the operator cannot concentrate his attention on the driving of the equipment only, and thus the safety is lowered.

On the other hand, the leveling control of the heavy equipment is required not only when the equipment moves or performs a work on an inclined site but also when the equipment is loaded on a trailer. In this case, it is cumbersome for an operator to manually perform the leveling.

Accordingly, there is a need for development of a leveling control system and method that can properly perform a leveling control in diverse operation states of the heavy equipment.

SUMMARY OF THE INVENTION

Accordingly, the present invention has been made to solve the above-mentioned problems occurring in the prior art while advantages achieved by the prior art are maintained intact.

One object of the present invention is to provide a leveling control system and method for heavy equipment, which can control leveling of an upper frame of the heavy equipment so as to prevent the upper frame from being unstably tilted or from overturning.

Another object of the present invention is to provide a leveling control system and method for heavy equipment, which can properly perform an automated leveling in accordance with the operation state of the equipment through providing of diverse operation modes according to the target of leveling.

Still another object of the present invention is to provide a leveling control system and method for heavy equipment, which can immediately stop tilting control through an operator's participation if an emergency occurs during an automatic tilting control process.

In order to accomplish these objects, there is provided a leveling control system for heavy equipment in which a lower frame having a traveling means and an upper frame are coupled to each other through a tilting means, according to the present invention, which includes a sensor unit, provided in the equipment, for measuring twist angles of the lower frame and the upper frame against a reference horizontal surface and a traveling speed of the equipment, and detecting working state information of working devices; a control unit for receiving the twist angles, the traveling speed, and the working state information, calculating a correction angle for the leveling control of the upper frame, and generating a control signal for instructing an operation of an actuator in accordance with the correction angle, the control unit including an auto leveling mode module for performing the leveling against a reference horizontal surface, a re-leveling mode module for performing the leveling against the reference horizontal surface in a standstill state of the equipment for a limited time, and a track leveling mode module for performing the leveling against the lower frame; and a driving unit for performing the leveling through the actuator in accordance with the control signal received therein.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
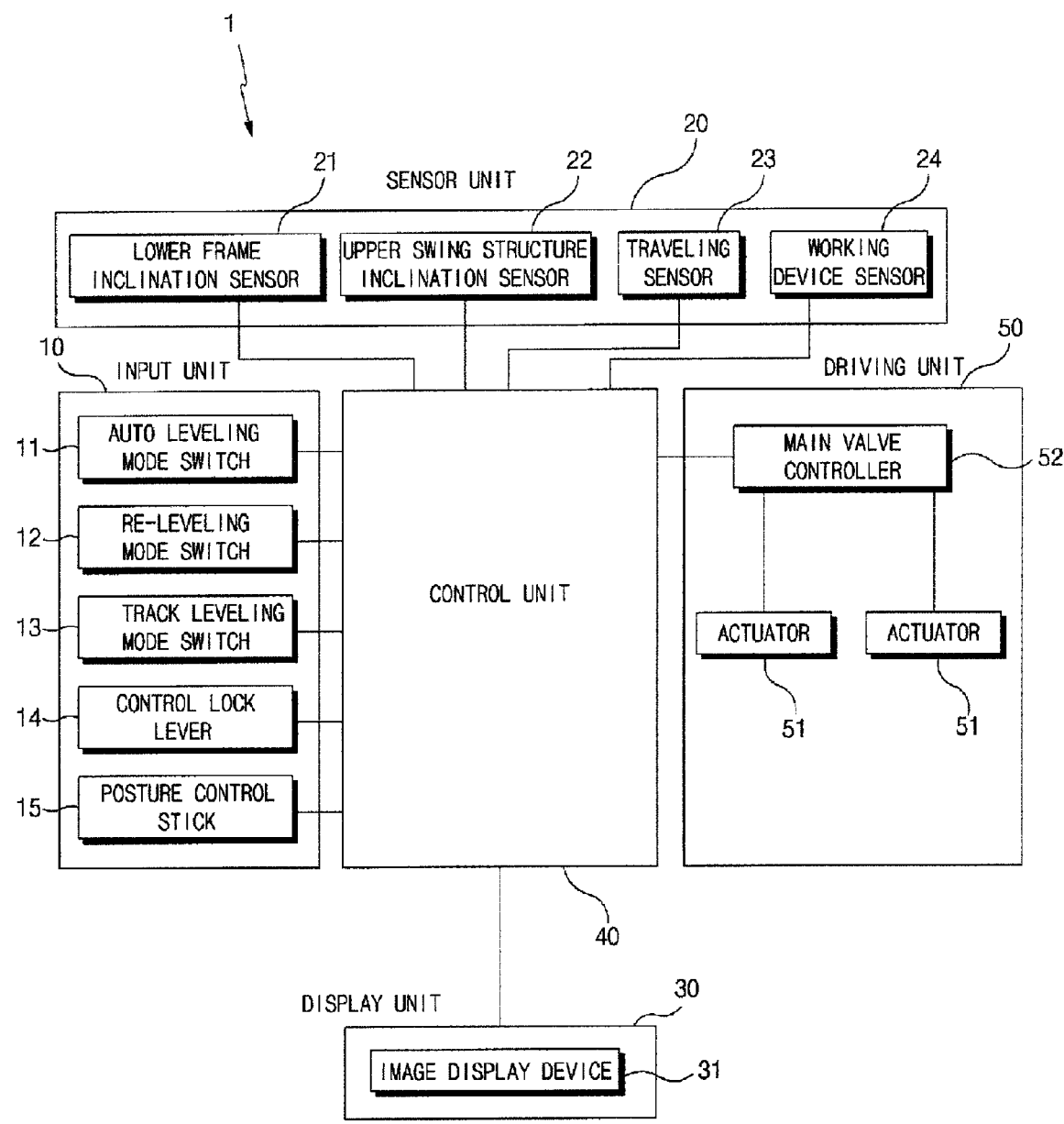
FIG. 1 is a block diagram of a leveling control system for heavy equipment according to an embodiment of the present invention.
Figure 2:
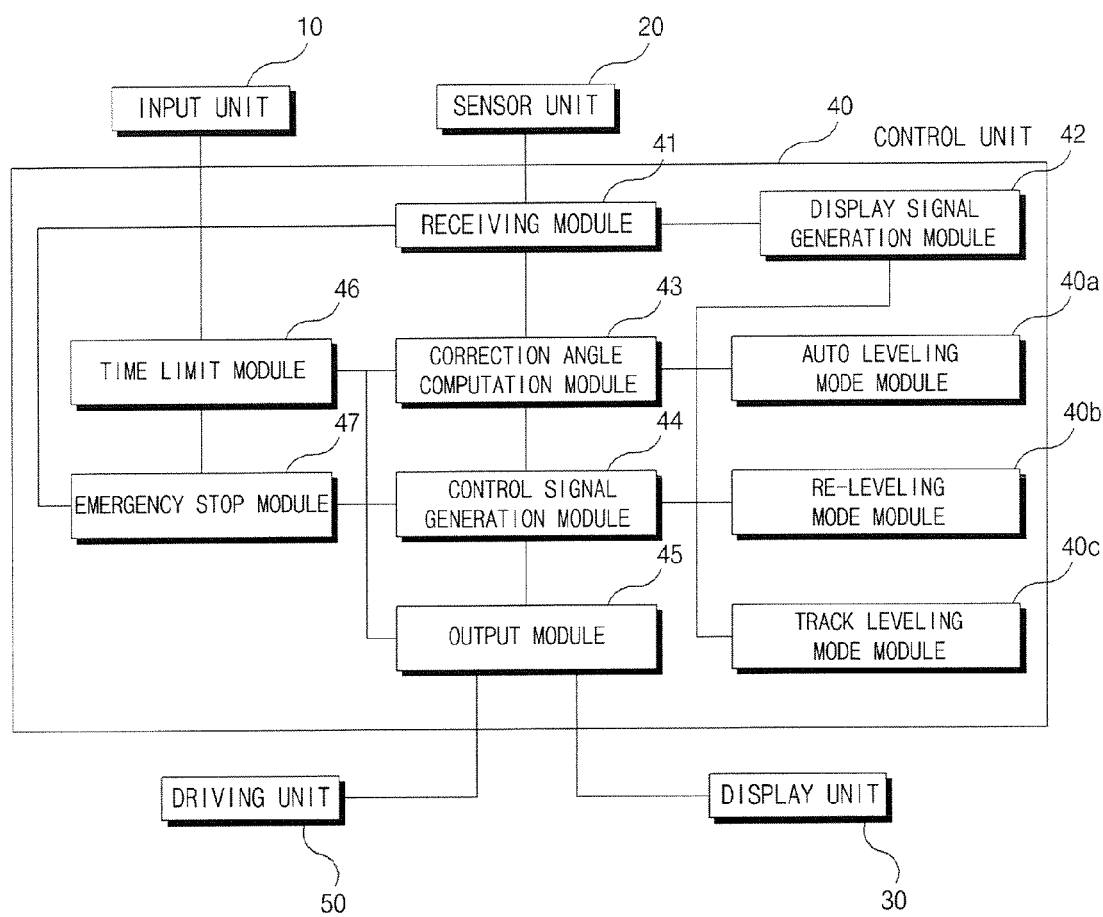
FIG. 2 is a block diagram illustrating the configuration of a control unit adopted in the leveling control system for heavy equipment as illustrated in FIG. 1.

Hereinafter, a leveling control system and method for heavy equipment according to preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

In the drawings, the reference numeral "201" denotes a reference horizontal surface, "220" denotes an expanded plane surface of the upper frame, "230" denotes an expanded plane surface of the lower frame, and "240" denotes an extended reference surface according to the reference angle that is a target of control.

In the following description of the present invention, the same drawing reference numerals are used for the same elements across various figures.

The term "twist angle" used in the description includes a pitching angle in forward/backward direction and a rolling angle in left/right direction. Unless the rolling angle and the pitching angle are used in distinction from each other, the twist angle means both the pitching angle and the rolling angle.

Also, the term "reference horizontal surface" means a horizontal surface against the direction of gravity.

According to a leveling control system and method for heavy equipment according to an embodiment of the present invention, a leveling mode is classified into an auto leveling mode, a re-leveling mode, a track leveling mode, and a manual mode.

First, the auto leveling mode aims at tilting control of an upper frame until the upper frame becomes parallel to a reference horizontal surface that is a horizontal surface against the direction of gravity. In the auto leveling mode, the tilting control is performed in a manner that, if the equipment is driven by a driving means provided on a lower driving structure, the tilting control is performed without being restricted by control time, and after the equipment stops driving, the tilting control is performed within a reference operation time that is the time limit set by a user.

The re-leveling mode refers to the performance of the auto leveling mode after the equipment stops driving. In the re-leveling mode, the tilting control is performed in a manner that, if the leveling against the reference horizontal surface is not satisfactorily completed, the tiling control with the same target as that of the auto leveling control for the reference operation time is performed once again by a user's selection.

The track leveling mode refers to the performance of an automatic tilting control based on an extended surface of the lower frame so that the upper frame becomes parallel to the lower frame. In the track leveling mode, the auto leveling is performed only for the reference operation time set by the user.

On the other hand, the manual leveling mode refers to a leveling mode in which the user tilts the upper frame through a separate input means.

As the user selects a proper one of the auto leveling mode, the re-leveling mode, the track leveling mode, and the manual mode, the upper frame of the equipment is tilted in the selected leveling mode.

A leveling control system 1 for heavy equipment according to an embodiment of the present invention includes an input unit 10, a sensor unit 20, a display unit 30, a control unit 40, and a driving unit 50.

The input unit 10 includes an auto leveling mode switch 11, a re-leveling mode switch 12, a track leveling mode switch 13, a control lock lever 14, and a posture controller 15.

The auto leveling mode switch 11 serves to activate the auto leveling mode in an on state (i.e. active state), and if the auto leveling mode switch 11 is in an off state (i.e. inactive state) during the tilting control process of the upper frame, it serves as an input means of an emergency stop condition to immediately stop the tilting control.

The re-leveling mode switch 12 or the track leveling mode switch 13 serves to activate the re-leveling mode or the track leveling mode in an on state (i.e. active state), and if the re-leveling mode switch 12 or the track leveling mode switch 13 is in an off state (i.e. inactive state) during the tilting control process, it serves as an input means of an emergency stop condition to stop the corresponding tilting control.

On the other hand, the control lock lever 14 serving as a separate input means of the emergency stop condition. If it is in an on state (i.e. active state), it is judged that the emergency stop condition is satisfied and the leveling control is immediately stopped, while if it is in an off state (i.e. inactive state), a normal leveling control is performed.

On the other hand, the posture controller 15 is an input means for performing the tilting of the upper frame in accordance with a user's manipulation. If there is an input through the posture controller, it is deemed that the manual mode switch is turned on, and thus the manual mode is activated.

In the sensor unit 20, inclination sensors 21 and 22, a traveling sensor 23, and a working device sensor 24 may be provided.

The inclination sensors are mounted on the lower frame and the upper frame, respectively. The inclination sensor 21 on the lower frame measures a pitching angle (i.e. front/rear inclination angle) and a rolling angle (i.e. left/right inclination angle) of the lower frame on the basis of a reference horizontal surface 210.

The traveling sensor 23 measures a traveling speed of the heavy equipment through a traveling means of the lower frame, and the working device sensor 24 detects whether the working device, such as a logging header, a bucket, or the like, is in an operation state, and outputs corresponding working state information.

The twist angles of the upper frame and the lower frame, the traveling speed, and the working state information, which are measured by the sensor unit 20, are transferred to the control unit 40 as control variables for tilting control.

The display unit 30 presents the respective twist angles to a user through a video display device 31. Through the display unit 30, a user can observe a tilting control process, and, if needed, can terminate the corresponding tilting control by satisfying an emergency stop condition through manipulation of the input unit 10. That is, the display unit 30 presents the current posture of the heavy equipment to the user in real time, so that the user can monitor whether the leveling control system malfunctions, or take part in the leveling control.

On the other hand, the driving unit 50 may include an actuator 51 using at least one hydraulic pressure for tilting the upper frame, and a main valve controller 52 for distributing a hydraulic control signal to respective hydraulic valves in the case where a plurality of actuators are provided in addition to the respective hydraulic valves for operating the actuator 51. Here, the actuators of the driving unit 50 may be of a hydraulic pressure type or an air pressure type, and instead of the actuator, an electric motor may be used as a tilting means.

The control unit 40, in the auto leveling mode, the re-leveling mode, and the track leveling mode, generates a necessary control signal by computing an operation region of the actuator 51 for the tilting control from the twist angles and the traveling speed measured by the sensor unit 20, and transmits the generated control signal to the driving unit.

Also, in order to perform the tilting control of the upper frame in accordance with a user's input in the manual mode, the control unit 40 can tilt the upper frame according to the user's intention by converting input values of the posture controller into operation values of the respective actuators.

For this, the control unit is provided with an auto leveling mode module 40a, a re-leveling mode module 40b, and a track leveling mode module 40c, which are activated in accordance with the selection of the auto leveling mode switch, the re-leveling mode switch, and the track leveling mode switch of the input unit, respectively, and controls a correction angle computation module and a control signal generation module, to be described later, to compute and generate a correction angle and a control signal, respectively, in accordance with the respective leveling modes.

The control unit 40 may include a receiving module 41, a display signal generation module 42, a correction angle computation module 43, a control signal generation module 44, an output module 45, and a time limit module 46.

The receiving module 41 receives the twist angles, the traveling speed, and the working state information measured by the sensor unit 20, and transmits the received signals to the display signal generation module 42, the correction angle computation module 43, and the control signal generation module 44.

The display signal generation module 42 generates a display signal for displaying the twist angles against the respective reference horizontal surfaces of the lower frame and the upper frame through the display unit 30.

The correction angle computation module 43 determines the twist angle of the upper frame as a first twist angle 201, and computes a correction angle 204 that is an angle displacement to be applied from the first twist angle 201 to the upper frame for the tilting control.

In the auto leveling mode and in the re-leveling mode, the leveling is performed based on the reference horizontal surface, and thus the same correction angle computation method is used. In the track leveling mode, however, the leveling is performed based on the lower frame, and thus the correction angle is obtained by using a different method.

The computation of the correction angle in the auto leveling mode and in the re-leveling mode according to an embodiment of the present invention will be described.

The first twist angle includes a pitching angle and a rolling angle against the reference horizontal surface of the upper frame, and the leveling control is performed to make the pitching angle and the rolling angle equal to the reference angle inputted by the user in the auto leveling mode or in the re-leveling mode.

That is, the reference angle is an angle to which the upper frame 104 is to be tilt-controlled and converged. For example, if the target is the horizontal leveling against the reference horizontal surface, the pitching angle and the rolling angle of the reference angle are set to 0°, respectively.

In this case, it is possible for a user to set the reference angle including the pitching angle and the rolling angle to a specified angle in advance, and this may be performed by a separate input device before the tilting control is performed according to the present invention. Accordingly, the user can improve the working efficiency by setting a working angle optimized according to the user's preference as the reference angle. However, even in this case, a means for proposing the setting range of the reference angle in consideration of the movement range of the center of gravity of the heavy equipment may be provided.

The correction angle is the twist angle of the upper frame to be corrected through the tilting control, and is calculated using the first twist angle, the reference angle, or the maximum allowable twist angle range as parameters.

In relation to the calculation of the correction angle, a second twist angle and the maximum allowable twist angle range, which are related to the limit of the tilting control range according to the characteristic of the driving unit, will be first described.

Figure 3:
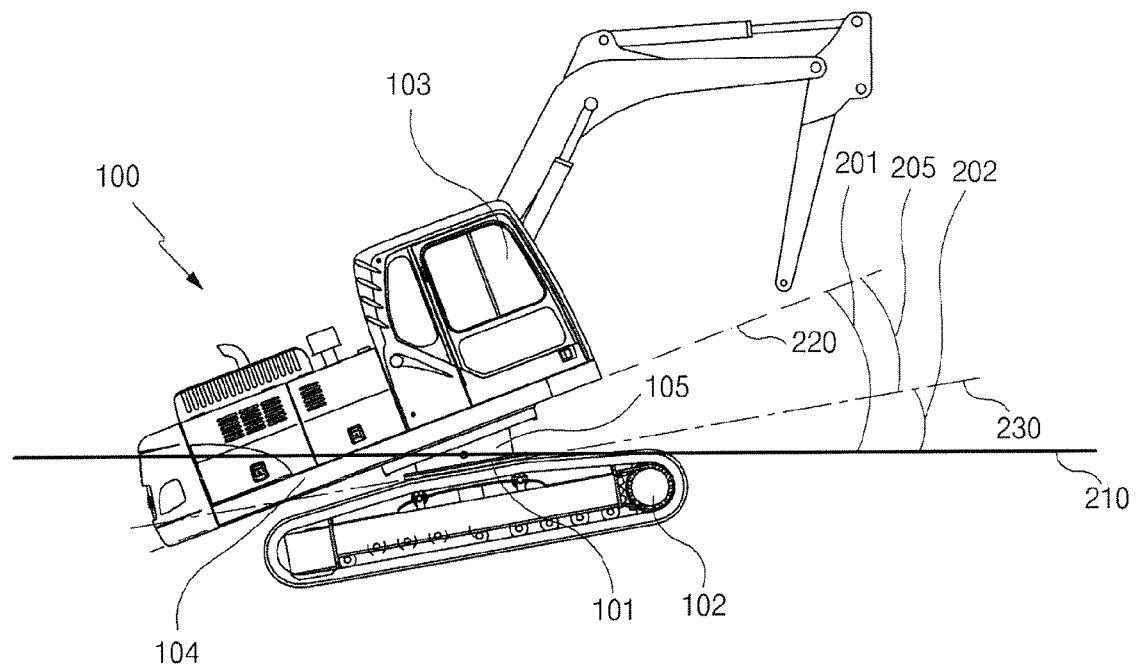
FIG. 3 is a side view of heavy equipment adopting a leveling control system for heavy equipment according to an embodiment of the present invention.

Referring to FIG. 3, the second twist angle is a twist angle of the upper frame that is based on the lower frame being determined by the first twist angle and the twist angle of the lower frame, and is determined by the following condition 1.

Second Twist Angle=First Twist Angle−Twist Angle of Lower Frame　　(Condition 1)

Figure 6:
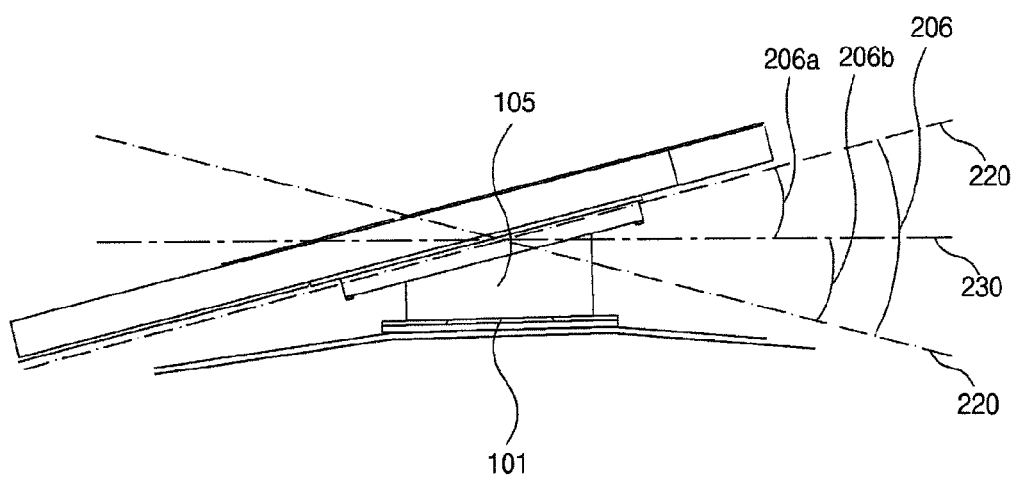
FIG. 6 is a view illustrating the maximum allowable twist angle range according to a tilting means of heavy equipment as illustrated in FIG. 3.

On the other hand, referring to FIG. 6, the maximum allowable twist angle range 206 is an inherent marginal displacement angle that is caused by the structural margin of the tilting means, and means an angle range in which the second twist angle 205 can be displaced. In accordance with the detailed configuration of the driving unit, the maximum and minimum pitching angles and the maximum and minimum rolling angles on the plane surface 230 of the lower frame may differ, and the maximum allowable twist angle range 206a means the variable margin of such pitching angle range and the rolling angle range. Hereinafter, it is defined that the maximum allowable upper limit twist angle range 206a includes the maximum pitching angle and the maximum rolling angle on the lower frame that is a reference plane surface, and the maximum allowable lower limit twist angle range 206b includes the minimum pitching angle and the minimum rolling angle on the lower frame that is a reference plane surface. The maximum allowable upper limit twist angle range 206a and the maximum allowable lower limit twist angle range 206b form the maximum allowable twist angle range 206, which is the physical marginal range of the tilting control.

The heavy equipment is bilaterally symmetric, and thus it is general that the maximum allowable upper limit rolling angle range is equal to the maximum allowable lower limit rolling angle range. However, front and rear parts of the heavy equipment are not symmetric, and thus it is general that the maximum allowable upper limit rolling angle range is not equal to the maximum allowable lower limit rolling angle range to limit the controllable range.

On the other hand, the control in the auto leveling mode or in the re-leveling mode differs depending on whether the reference angle 203 is included in the maximum allowable twist angle range. If the reference angle 203 is within the maximum allowable twist angle range 206 as calculated above, it is possible to tilt the upper frame so that the first twist angle 201 becomes equal to the reference angle 203, and thus the correction angle 204 is determined based on the reference angle 203.

Figure 7:
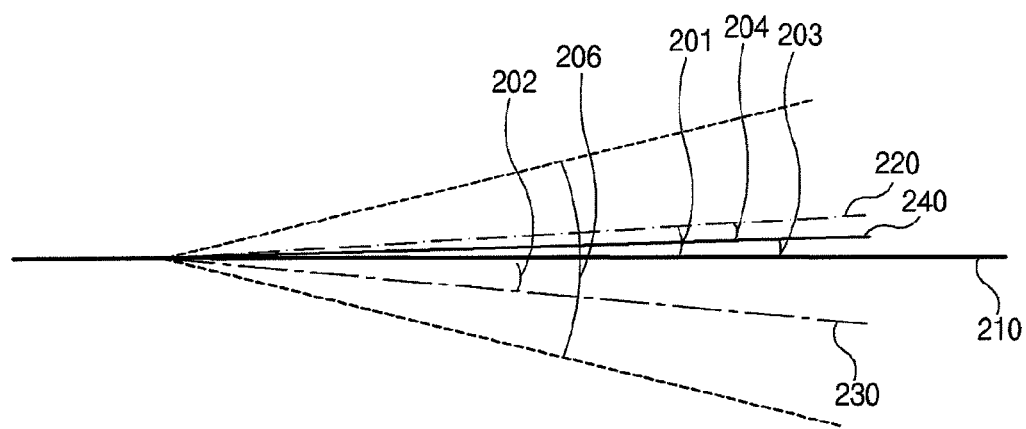
FIG. 7 is a view illustrating correction angles in an auto leveling mode or a re-leveling mode according to an embodiment of the present invention.

That is, as illustrated in FIG. 7, if the condition is set to "Twist angle of lower frame−Maximum allowable lower limit twist angle value≦Reference angle≦Twist angle of lower frame+Maximum allowable upper limit twist angle range", the upper frame can be tilted to match the reference angle 203, and the correction angle 204 at this time is determined by the following condition 2.

Correction angle=Reference Angle−First Twist Angle (Condition 2)

On the other hand, in the case where the reference angle 203 is out of the maximum allowable twist angle range 206, the correction angle 204 is determined based on the maximum allowable upper limit twist angle range 206a or the maximum allowable lower limit twist angle range 206b. That is, since the upper frame cannot be tilted over the maximum allowable twist angle range, the control target is changed so that it is leveled near the reference angle at maximum. As a result, the corresponding leveling control is performed based on the maximum allowable upper limit twist angle range or the maximum allowable lower limit twist angle range, instead of the above-described reference angle.

In this case, whether to level the first twist angle on the basis of the maximum allowable upper limit twist angle range or the maximum allowable lower limit twist angle range is determined depending on whether the reference angle corresponds to "Reference angle<twist angle of lower frame−maximum allowable lower limit twist angle range" or "Twist angle of lower frame+maximum allowable lower limit twist angle range<Reference angle".

Figure 8:
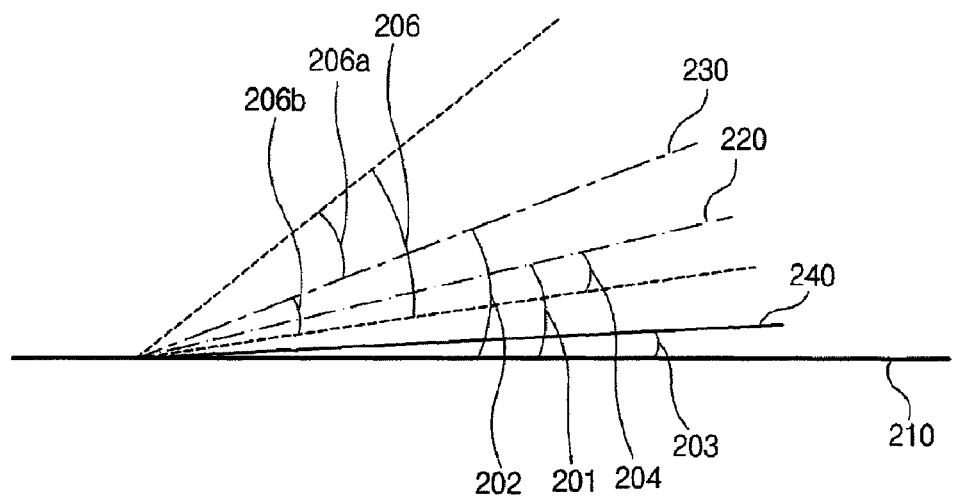
FIG. 8 is a view illustrating correction angles in an auto leveling mode or a re-leveling mode according to another embodiment of the present invention.

First, as illustrated in FIG. 8, in the case of "Reference angle<twist angle of lower frame−maximum allowable lower limit twist angle range", the tilting control is performed in a manner that the correction angle 204 is determined based on the maximum allowable lower limit twist angle range 206b, under the following condition 3, so that the upper frame is tilted toward the maximum allowable lower limit twist angle range 206b to approach the reference angle.

Correction angle=Twist Angle of Lower Frame−Maximum Allowable Lower Limit Twist Angle Range−First Twist Angle (Condition 3)

Figure 9:
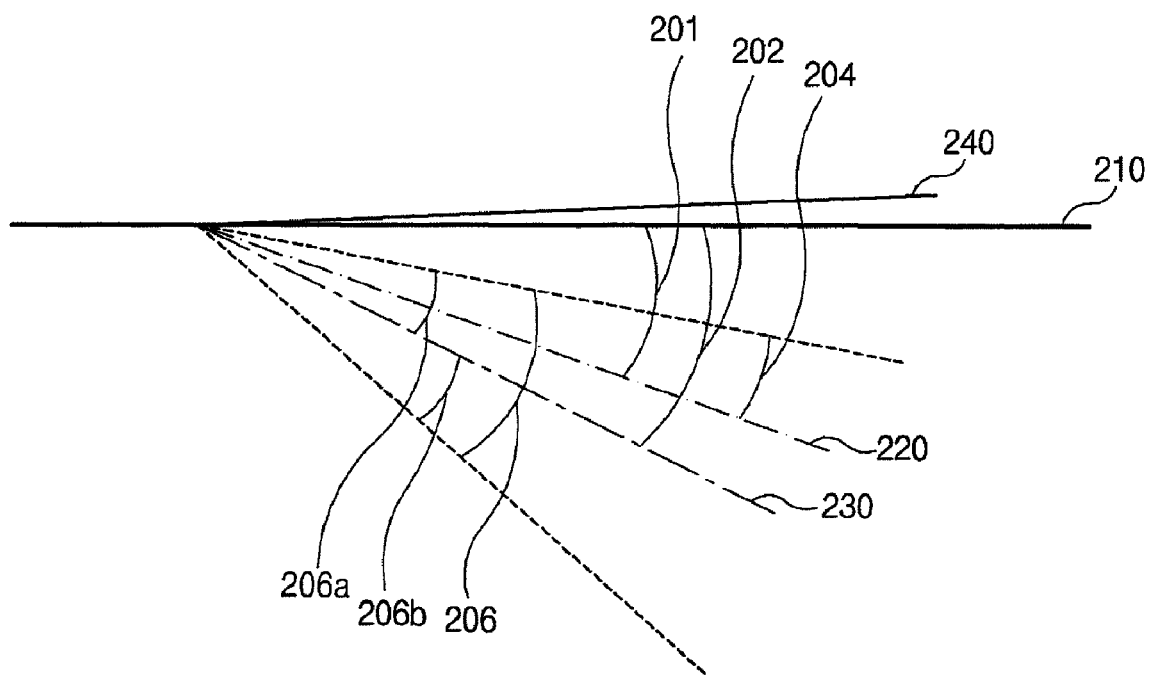
FIG. 9 is a view illustrating correction angles in an auto leveling mode or a re-leveling mode according to still another embodiment of the present invention.

On the other hand, as illustrated in FIG. 9, in the case of "Twist angle of lower frame+maximum allowable upper limit twist angle range<reference angle", the tilting control is performed in a manner that the correction angle is determined under the following condition 4, so that the upper frame is tilted toward the maximum allowable upper limit twist angle range 206a to approach the reference angle 203.

Correction angle=Twist Angle of Lower Frame−Maximum Allowable Upper Limit Twist Angle Range−First Twist Angle (Condition 4)

If the upper frame is tilted to match the reference angle 203, the correction angle 204 is computed based on the reference angle 203, while if the angle that can be tilted is restricted by the limit of the maximum allowable twist angle range, the correction angle 204 is computed based on the limit of the maximum allowable twist angle range.

In addition, since the twist angle 202 of the lower frame includes the pitching angle and the rolling angle, the pitching angle and the rolling angle, which are included in the correction angle, are independently computed by selectively using the conditions 2 to 4, and the resultant pitching angle and rolling angle correspond to the correction angle.

On the other hand, the calculation of the correction angle in the track leveling mode is as follows.

The correction angle computation module 43 sets the twist angle of the upper frame to the first twist angle 201, and computes the correction angle 204, which refers to the angle displacement to be applied to the upper frame for the tilting control, from the first twist angle 201. At this time, the first twist angle 201 becomes the same as the twist angle 202 of the lower frame.

The correction angle 204 is determined by the following condition 5 based on the twist angle 202 of the lower frame.

Correction angle=Twist Angle of Lower Frame−First Twist Angle (Condition 5)

In this case, the value of the correction angle 204 has a sign opposite to that of the twist angle of the upper frame against the lower frame, i.e. a sign opposite to that of the second twist angle 205.

Figure 10:
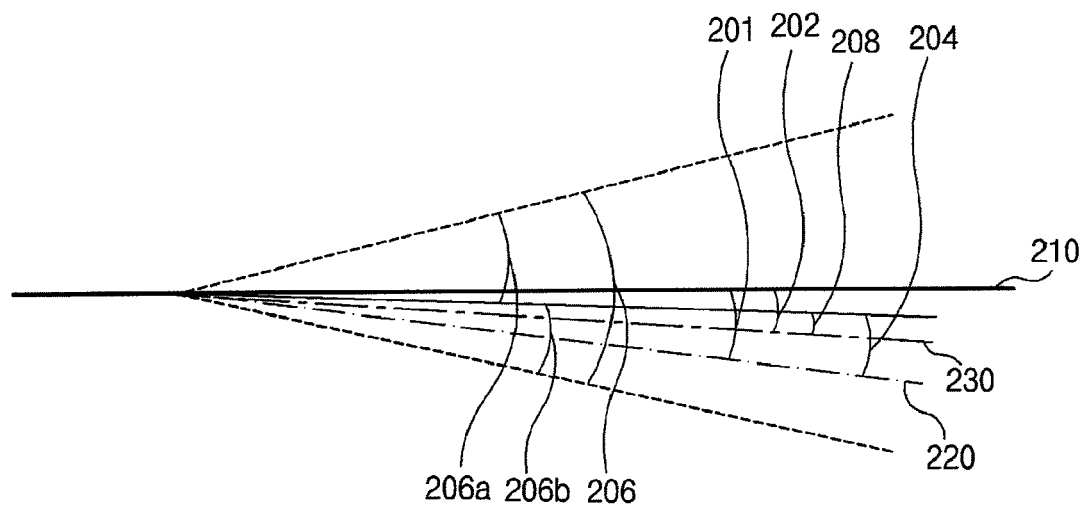
FIG. 10 is a view illustrating correction angles in a track leveling mode according to still another embodiment of the present invention.

On the other hand, if the correction angle further includes a weight angle (i.e. a pitching angle and a rolling angle) 208 in accordance with a user's optional setting, as illustrated in FIG. 10, the correction angle 204 may further include the weight angle 208 in addition to the twist angle 202 of the lower frame. In this case, the correction angle 204 is determined by the following condition 6.

Correction angle=Twist Angle of Lower Frame+Weight Angle−First Twist Angle (Condition 6)

Here, the weight angle 208 means the pitching angle and the rolling angle added to the twist angle 202 of the lower frame, and due to this weight angle 208, the target of the track leveling is changed to be further pitched or rolled as much as the weight value 208 from the state that the upper frame is parallel to the extended surface of the lower frame.

That is, by changing the basis of obtaining the correction angle 204 from "Twist angle of lower frame" to "Twist angle of lower frame+Weight angle", the correction angle 204 to which the weight angle is added is calculated. If the weight value 208 is not set by the user, it can be assumed that the weight angle 208 is set to 0°, and thus the calculation of the correction angle 204 can be generalized by the above-described condition 6.

On the other hand, the control signal generation module 44 determines an operation region of the actuator 51 of the driving unit in accordance with the correction angle obtained by the above-described method, and generates the control signal according to this operation region.

At this time, if a plurality of actuators is provided in the driving unit, the compensation relations among the actuators should be considered in accordance with the pitching angle and the rolling angle of the correction angle.

Figure 4:
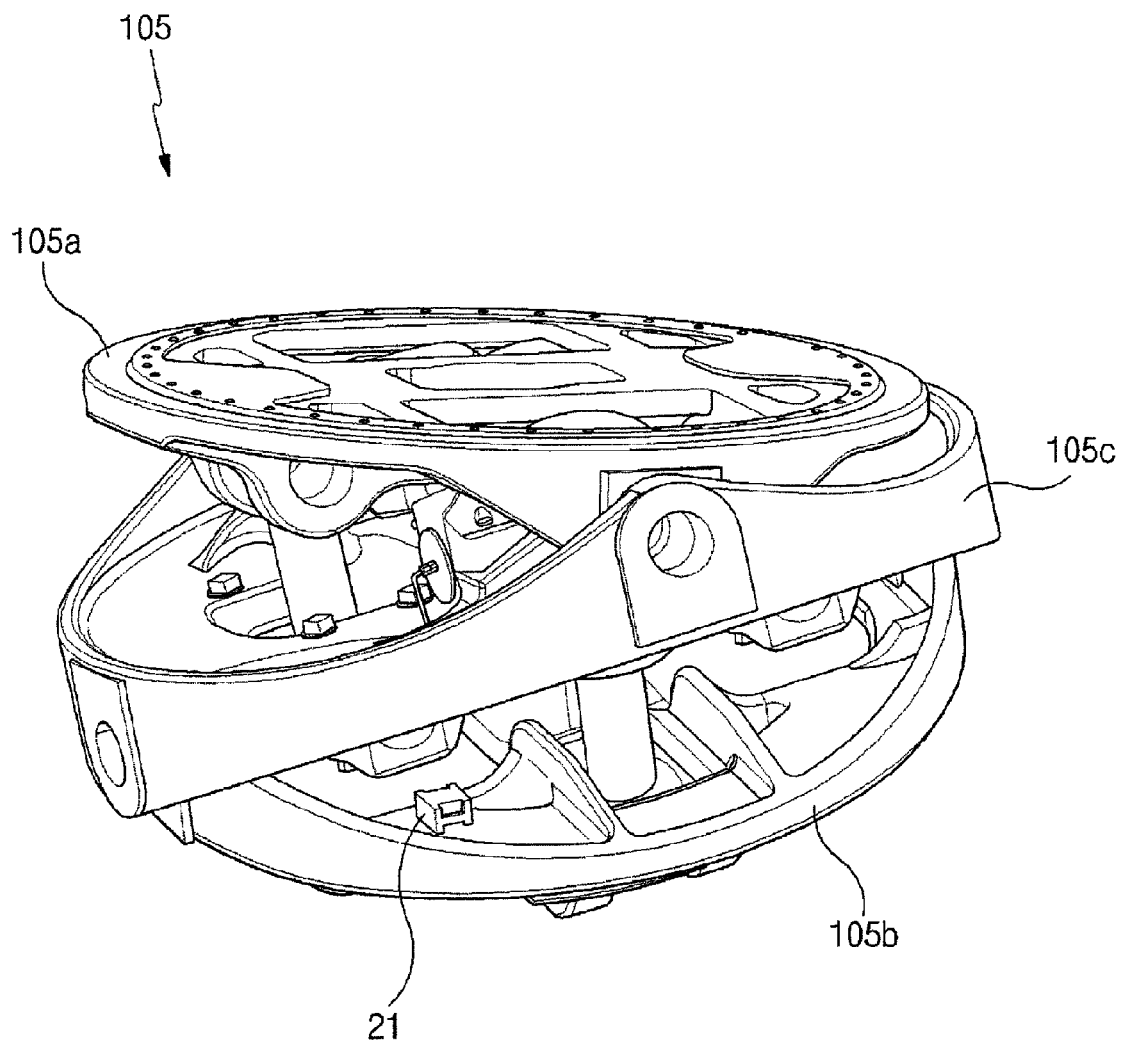
FIG. 4 is a perspective view of a tilting means of heavy equipment as illustrated in FIG. 3.
Figure 5:
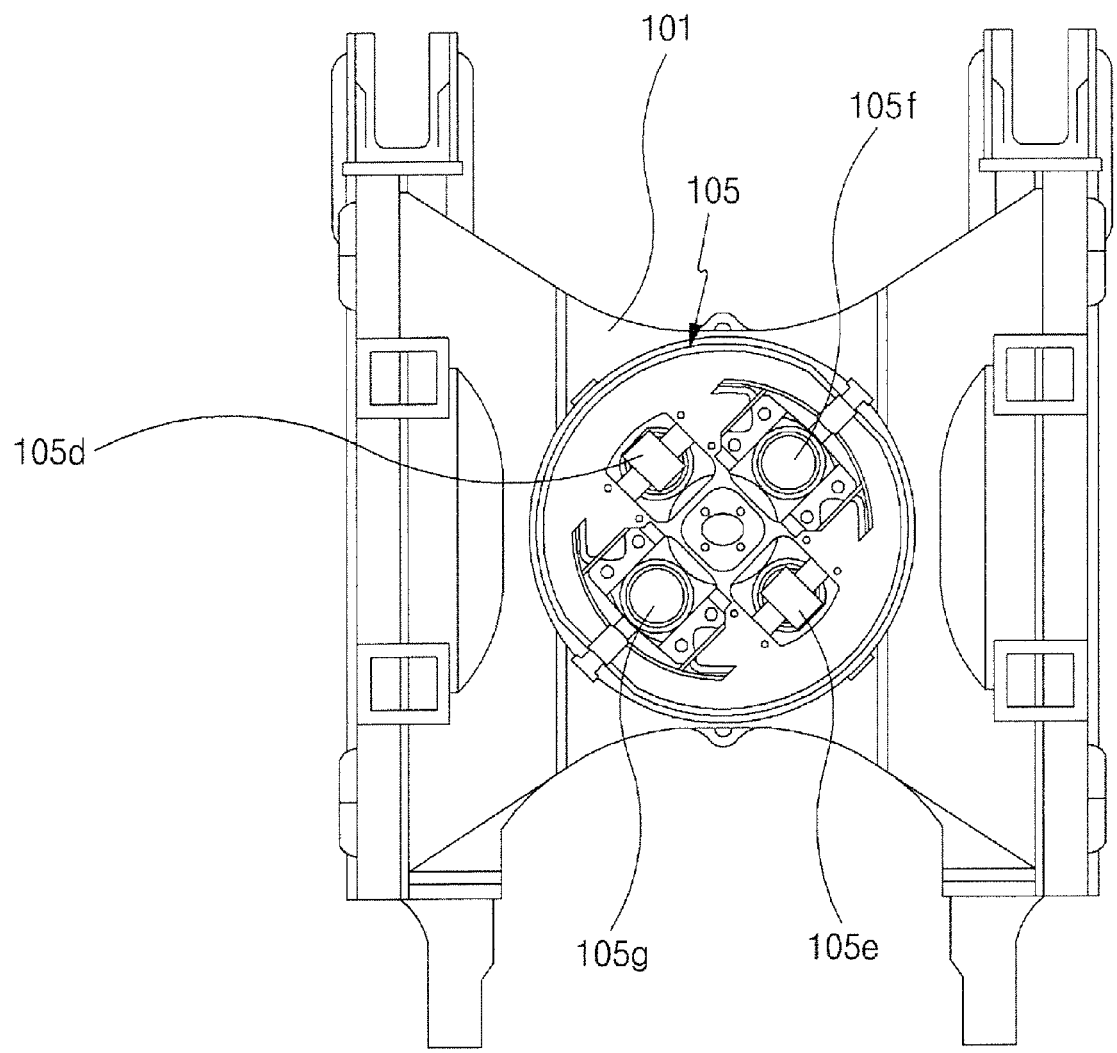
FIG. 5 is a schematic sectional view of a lower frame and a tilting means of heavy equipment as illustrated in FIG. 3.

For example, as illustrated in FIG. 4, the tilting means 105 is provided with a swing bearing mount frame 105a to which the upper frame is rotatably coupled, a support frame 105b fixed to the lower frame, and a tilt frame 105c for connecting the swing bearing mount frame to the support frame. The swing bearing mount frame and the support frame have a construction in which for actuators are provided. In this case, as illustrated in FIG. 5, the four actuators are installed in slanting lines.

In order to increase the front pitching angle in the tilting means 105 provided with the four actuators 105d, 105e, 105f, and 105g, it is required that two front actuators 105d and 105f are expanded, and in proportion to this expansion, two rear actuators 105e and 105g are contracted. In order to increase the right rolling angle, it is required that two right actuators 105e and 105f are expanded and in proportion to this expansion, two left actuators 105d and 105g are contracted.

In order to increase/decrease the first twist angle according to the correction angle determined by a certain pitching angle and rolling angle in the above-described method, the operation region is determined from the mutual displacement relations among the actuators predetermined according to the tilting means.

On the other hand, the currently expanded length of the respective actuator 51 of the driving unit 50, which can be analogized from the second twist angle, may be determined as an initial value of the control signal, and the control signal corresponding to the intermittent time of a hydraulic valve that operates the corresponding actuator 51 is generated in accordance with the operation region determined by the correction angle as described above.

In the present invention, the control signal may be classified into a first control signal for operating the actuator at normal speed and a second control signal for operating the actuator at low speed. That is, the first and second control signals are selectively generated depending on whether or not the first twist angle approaches the limit of the maximum allowable twist angle range or the reference angle, and thus the operation speed of the actuator is controlled.

More specifically, if the first twist angle is changed in the neighborhood of the upper limit or lower limit of the maximum allowable twist angle range in the auto leveling mode and in the re-leveling mode, it means that the actuators are operated in the neighborhood of the maximum expansion point or the maximum contraction point. In this case, if pistons of the actuators are operated at high speed, collision or impact may occur at the maximum expansion point or the maximum contraction point due to the piston inertia of corresponding actuator. In order to mitigate such collision or impact and to prevent the damage of the cylinder at the end of the corresponding actuator, the second control signal for operating the actuator at low speed is generated.

Also, if the actuators are operated in the neighborhood of the reference angle, the second control signal for operating the actuator at low speed is generated when the first twist angle converges into the target of control and thus the correction angle becomes 0°, in order to protect the user from the impact caused by an abrupt stop of the actuators 105d, 105b, 105c, and 105.

Hereinafter, detailed conditions for generating the second control signal in the auto leveling mode or in the re-leveling mode are as follows.

Figure 11:
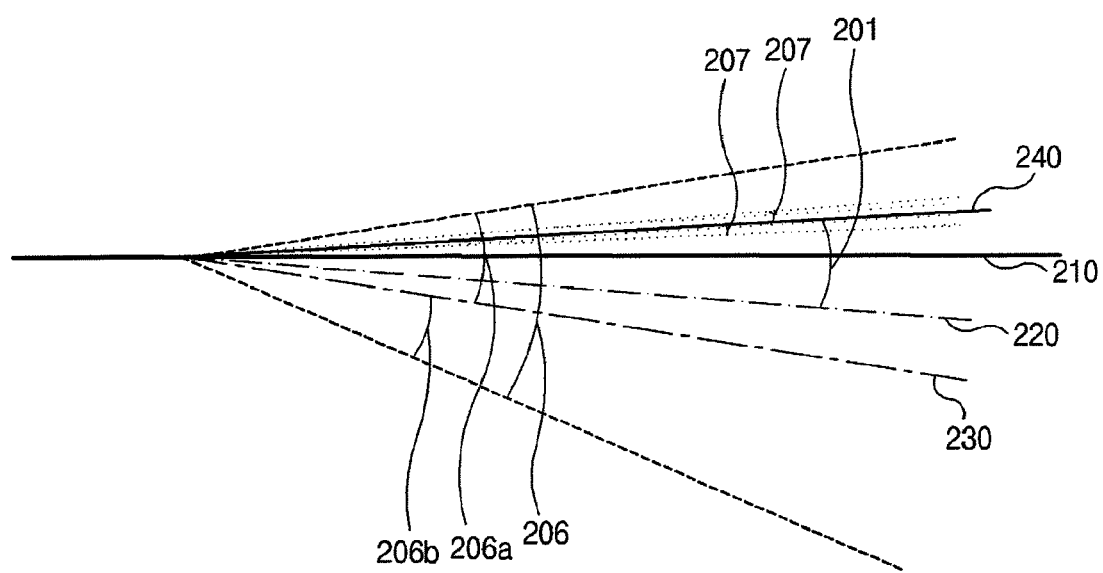
FIG. 11 is a view illustrating a reference convergence range in an auto leveling mode or a re-leveling mode according to still another embodiment of the present invention.

First, as illustrated in FIG. 11, it is considered that the reference angle 203 is positioned within the maximum allowable twist angle range 206, i.e. the first twist angle 201 is displaced in the neighborhood of the reference angle 203 as illustrated in FIG. 11. That is, if the first twist angle 201 converges within a specified range of the reference angle 203, the control signal is changed from the first control signal to the second control signal. For this, the specified range of the reference angle 203 (hereinafter referred to as "reference convergence range") is determined according to the following condition 7.

Reference Angle−Constant Angle≦Reference Convergence Range≦Reference Angle+Constant Angle  (Condition 7)

Here, the constant angle 207 is an angle in a speed reduction region determined by user's optional setting. That is, if the first twist angle 201 converges into the range of "Reference Angle±Constant Angle", the second control signal for operating the actuator at low speed is generated.

Figure 12:
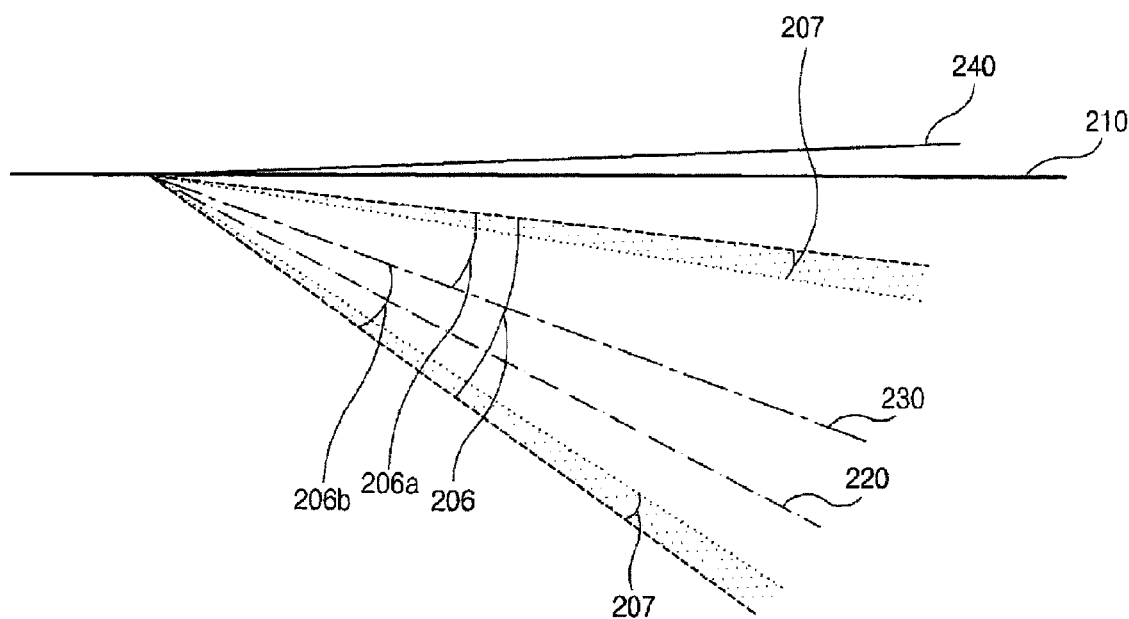
FIG. 12 is a view illustrating a marginal convergence range in an auto leveling mode or a re-leveling mode according to still another embodiment of the present invention.

On the other hand, as illustrated in FIG. 12, it is considered that the reference angle 203 exceeds the maximum allowable twist angle range 206. This refers to the case that the first twist angle 201 is level-controlled in the neighborhood of the maximum allowable upper limit twist angle range 206a, or is controlled in the neighborhood of the maximum allowable lower limit twist angle range 206b.

For this, a specified range in the neighborhood of the upper limit or lower limit of the maximum allowable twist angle range 206 is determined by the following condition 8.

Twist Angle of Lower Frame−Maximum Allowable Lower Limit Twist Angle Range≦Marginal Convergence Range≦Twist Angle of Lower Frame−Maximum Allowable Lower Limit Twist Angle Range+Constant Angle  (Condition 8)

or

Twist Angle of Lower Frame+Maximum Allowable Upper Limit Twist Angle Range−Constant Angle≦Marginal Convergence Range≦Twist Angle of Lower Frame+Maximum Allowable Upper Limit Twist Angle Range Here, the constant angle 207 is an angle in a speed reduction region determined by user's optional setting.

More specifically, if the reference angle 203 is smaller than the "Twist angle of lower frame−Maximum allowable lower limit twist angle range", the upper frame is tilt-controlled with a view to reaching "Twist angle of lower frame−Maximum allowable lower limit twist angle range". Accordingly, if the first twist angle 201 becomes smaller than the "Twist angle of lower frame−Maximum allowable lower limit twist angle range+Constant angle", the second control signal for operating the actuators at low speed is generated in order to prevent the damage of the cylinder due to an impact. Thereafter, the tilting is performed slowly to reach the maximum allowable lower limit twist angle.

By contrast, in the case where the reference angle is based on "Twist angle of lower frame−Maximum allowable upper limit twist angle range", and the first twist angle becomes larger than the "Twist angle of lower frame+Maximum allowable upper limit twist angle range−Constant angle", the second control signal is generated to protect the user. Thereafter, the tilting is performed slowly to reach the maximum allowable upper limit twist angle.

On the other hand, in the case of the track leveling mode, if the twist angle 202 of the lower frame or the weight angle 208 is not 0°, the calculation of the correction angle 204, which is calculated based on an angle obtained by adding the weight angle 208 to the twist angle 202 of the lower frame, is always performed within the maximum allowable twist angle range 206.

Figure 13:
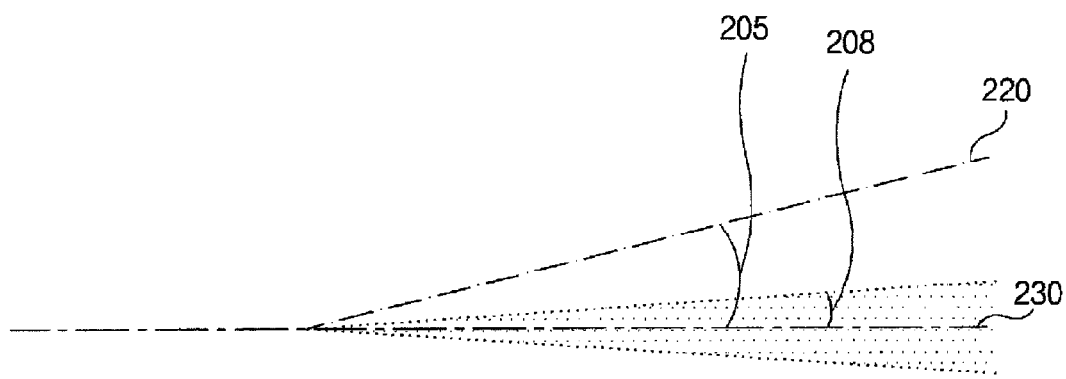
FIG. 13 is a view illustrating a speed convergence range in a track leveling mode according to still another embodiment of the present invention.
Figure 14:
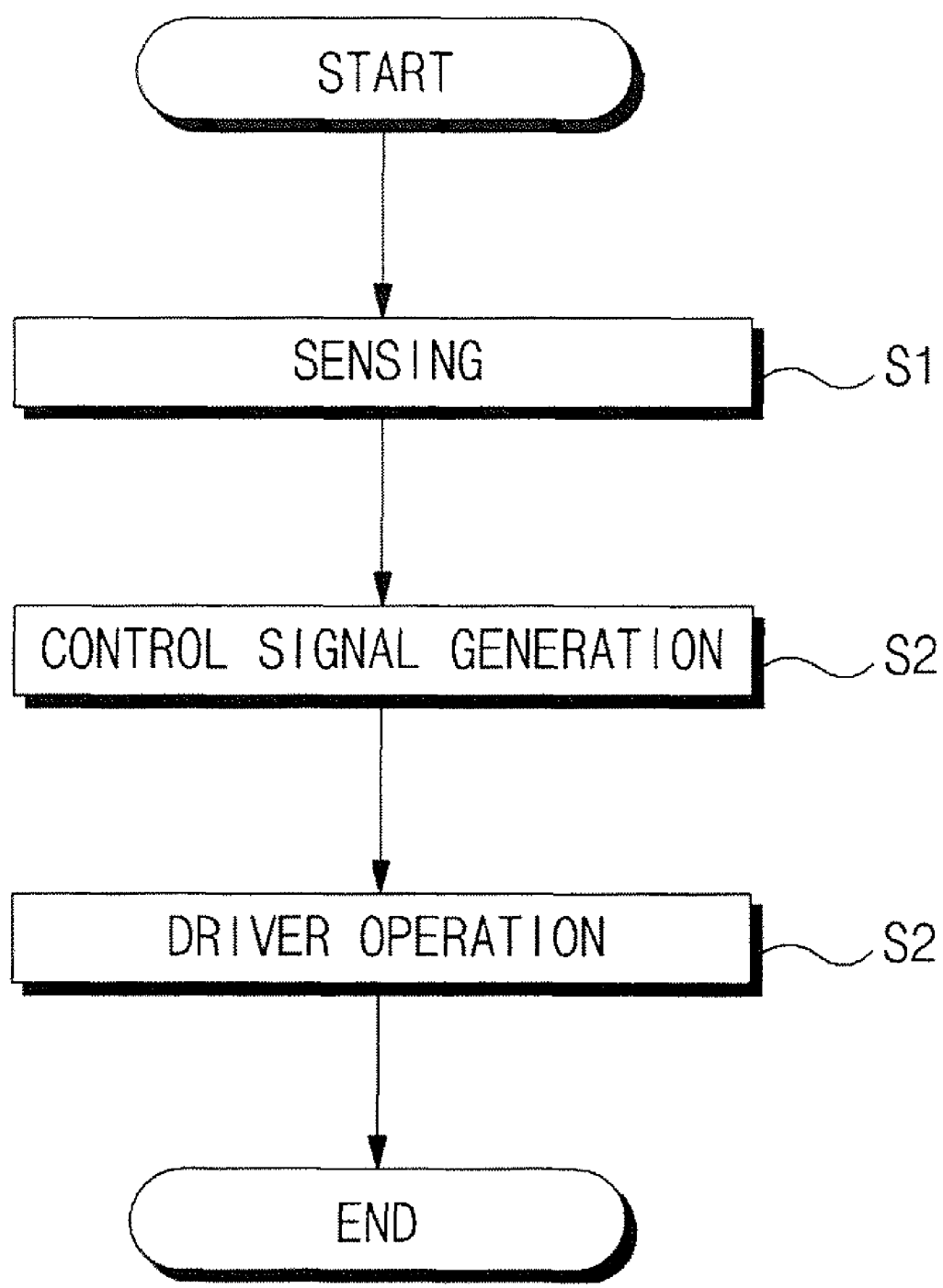
FIG. 14 is a schematic flowchart illustrating a leveling control method for heavy equipment according to an embodiment of the present invention.
Figure 15:
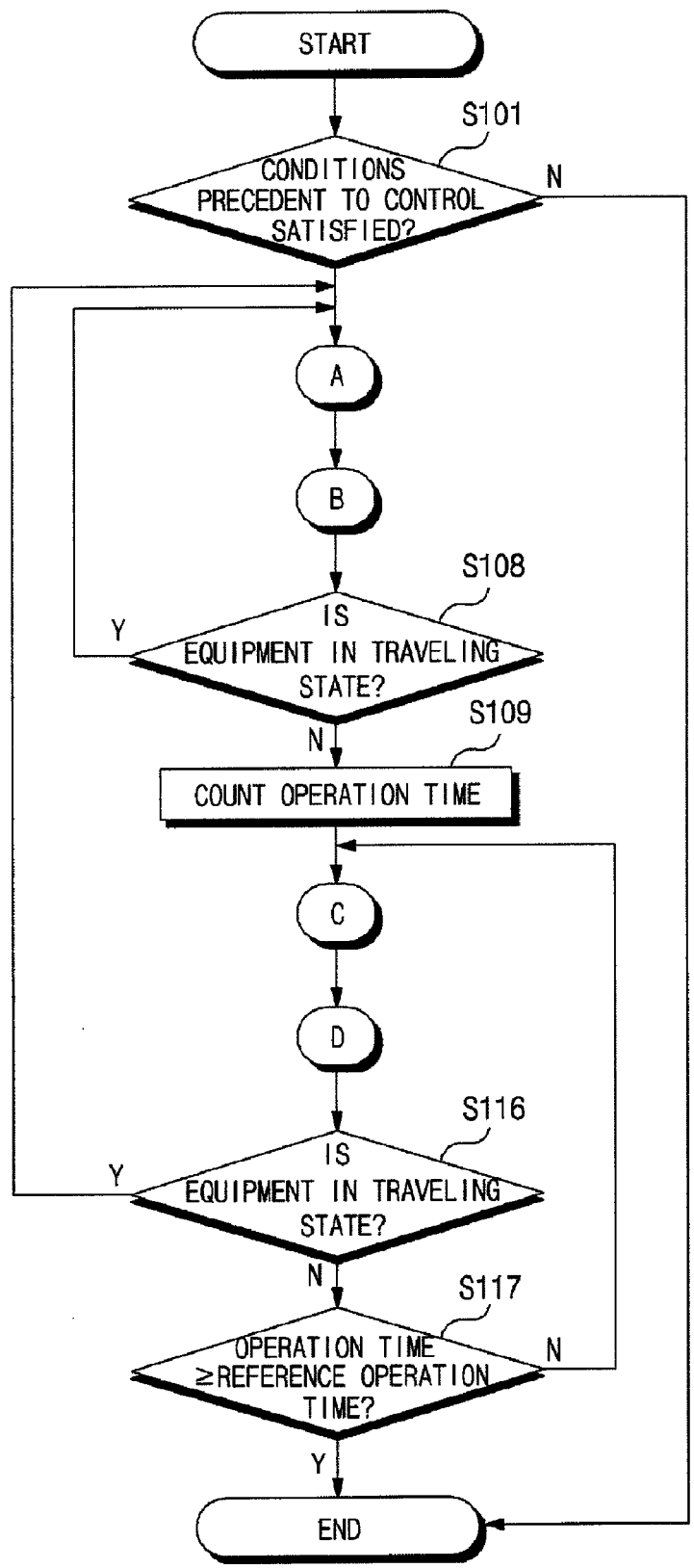
FIG. 15 is a flowchart illustrating a step of generating a control signal according to an auto leveling mode adopted in a leveling control method for heavy equipment as illustrated in FIG. 14.
Figure 16:
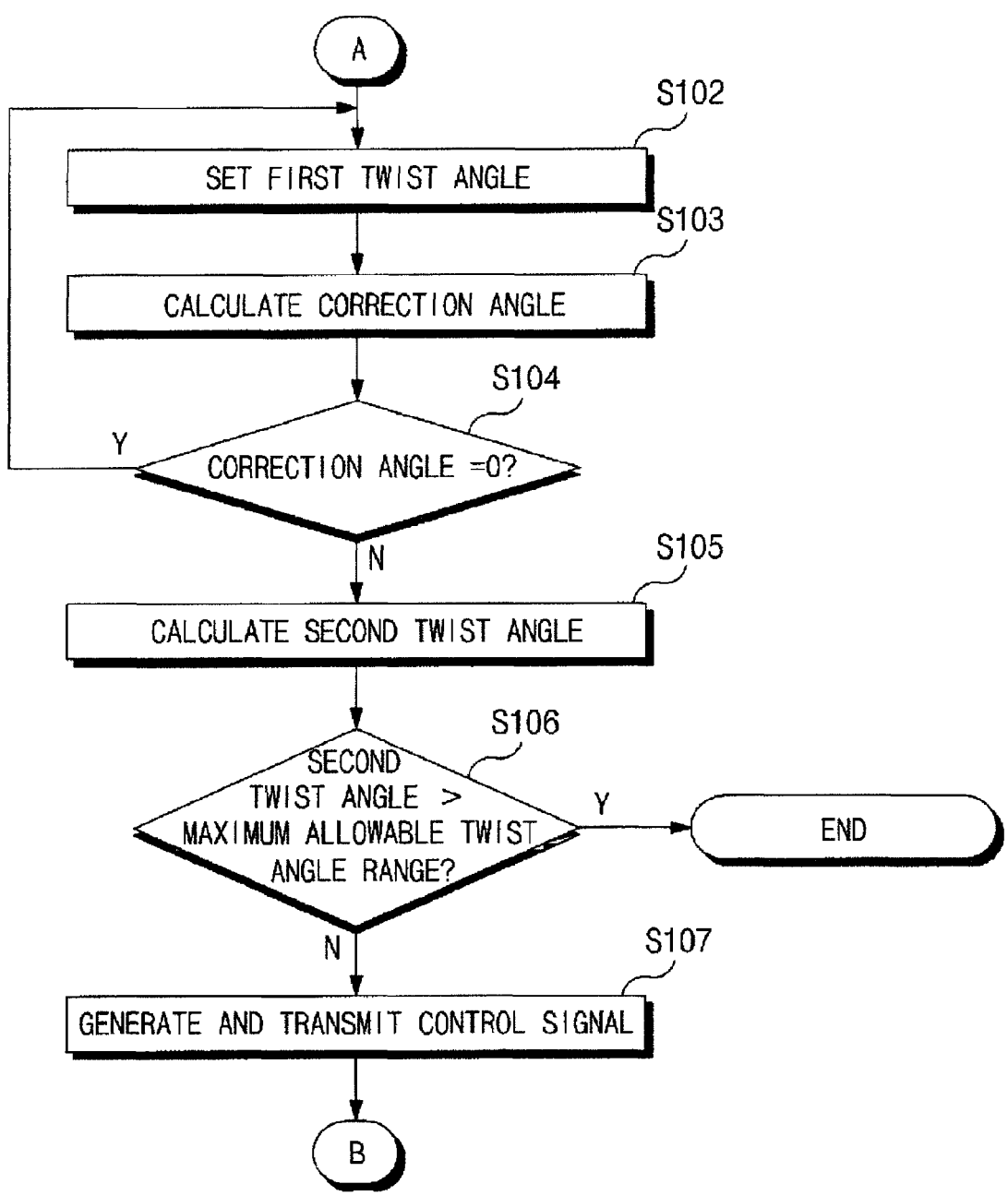
FIG. 16 is a flowchart illustrating steps A-B as illustrated in FIG. 15.
Figure 17:
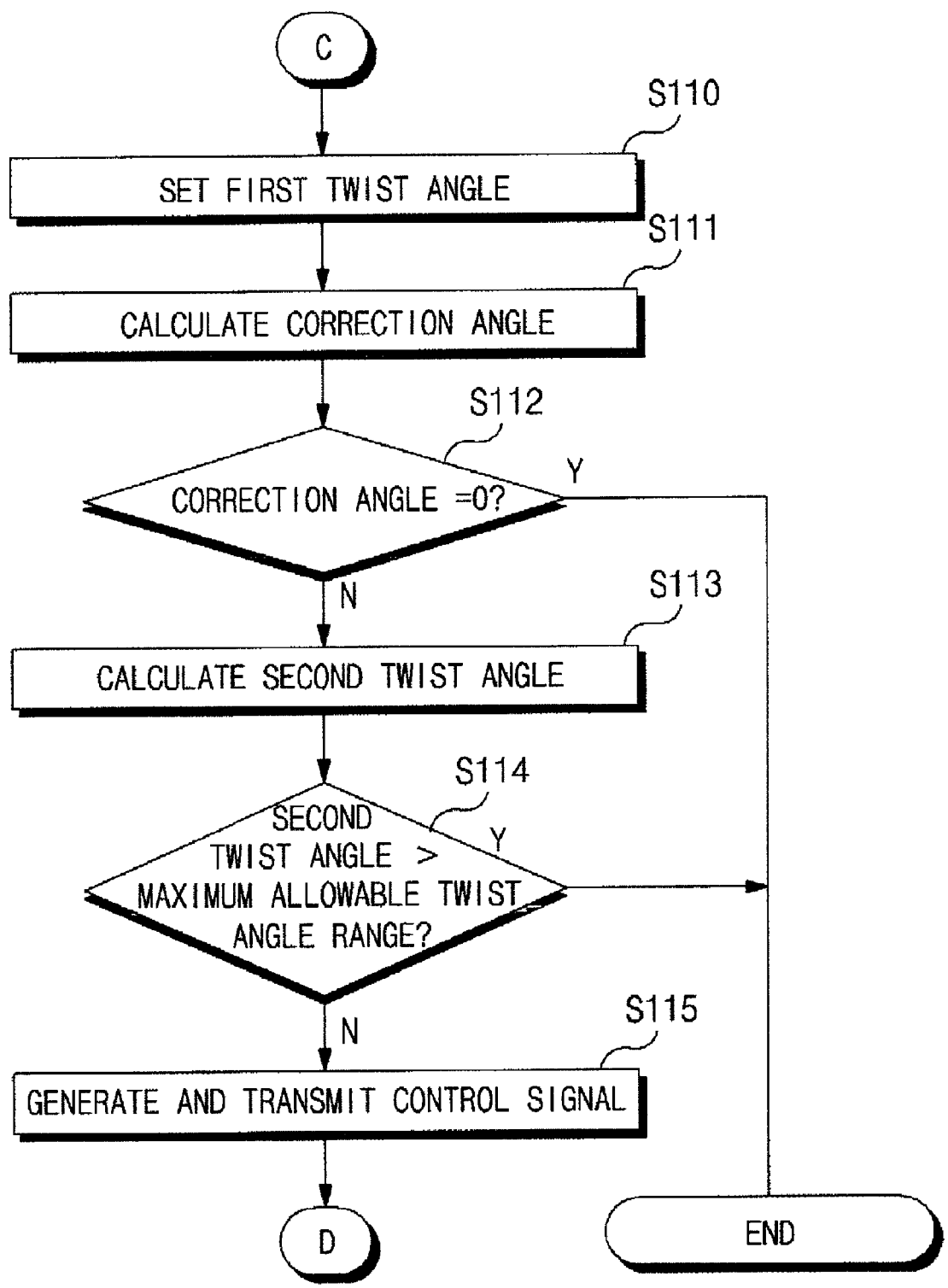
FIG. 17 is a flowchart illustrating steps C-D as illustrated in FIG. 15.
Figure 18:
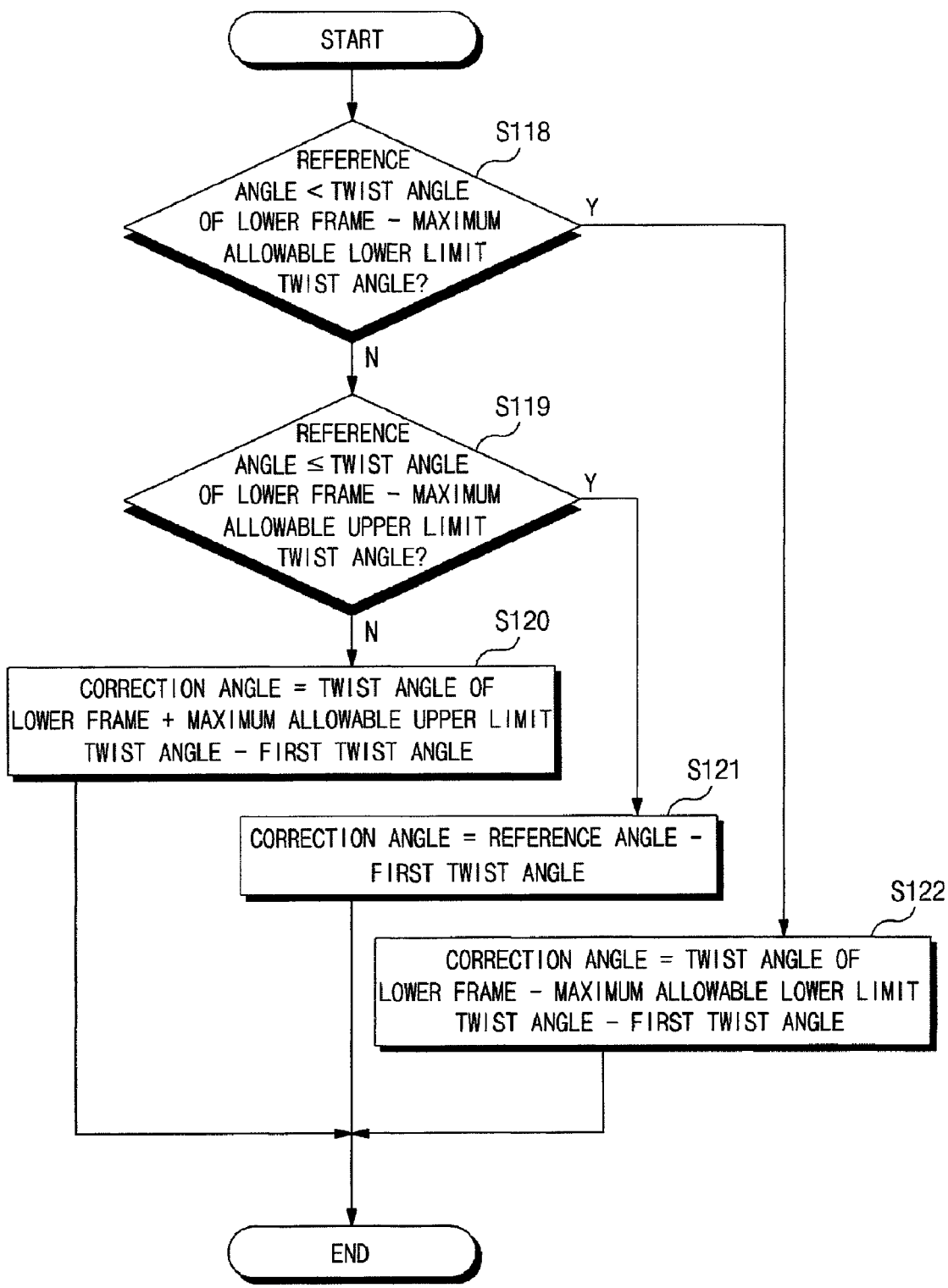
FIG. 18 is a flowchart illustrating a step of calculating correction angles as illustrated in FIGS. 16 and 17.
Figure 19:
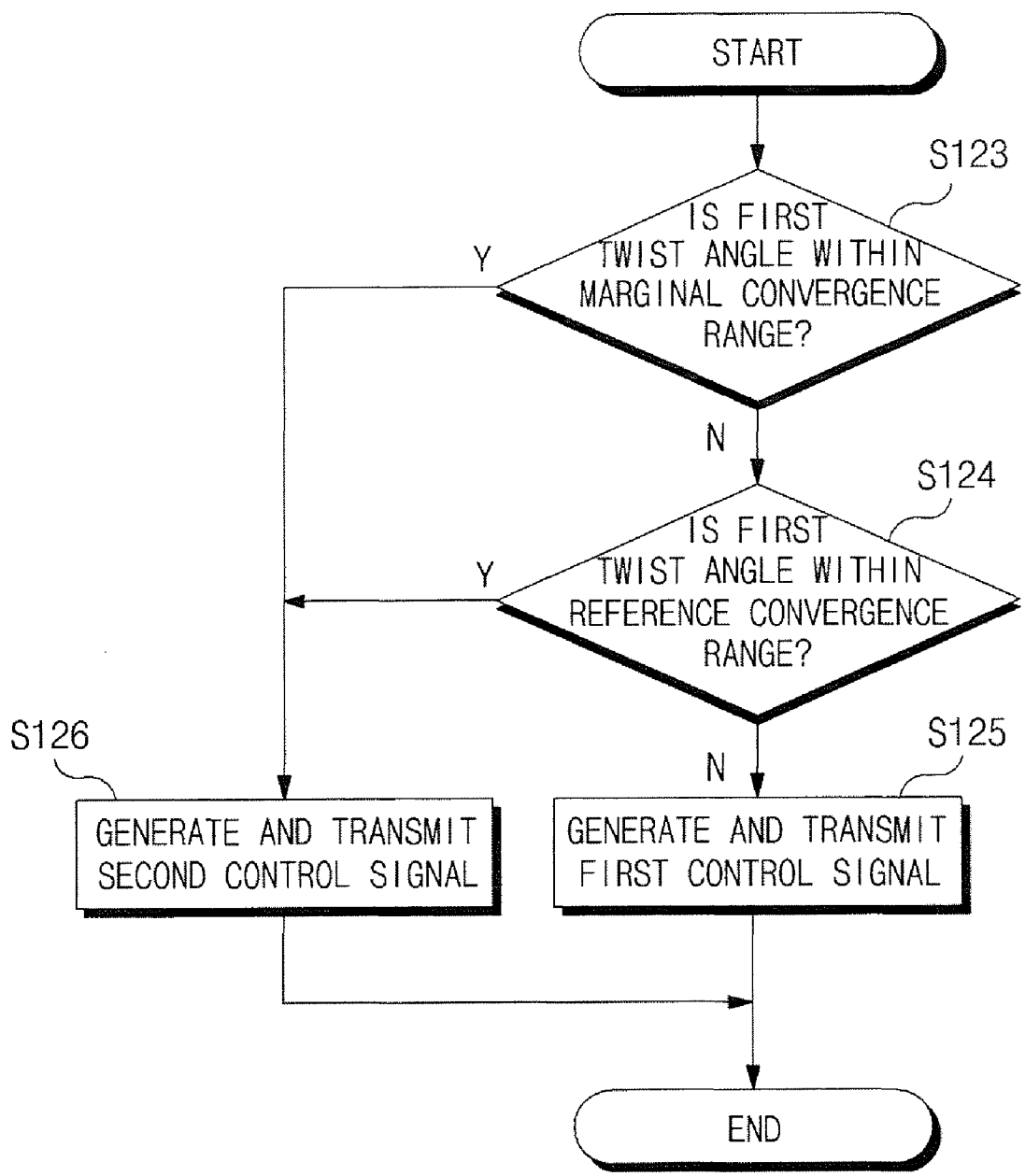
FIG. 19 is a flowchart illustrating a step of generating and transmitting as illustrated in FIGS. 16 and 17.
Figure 20:
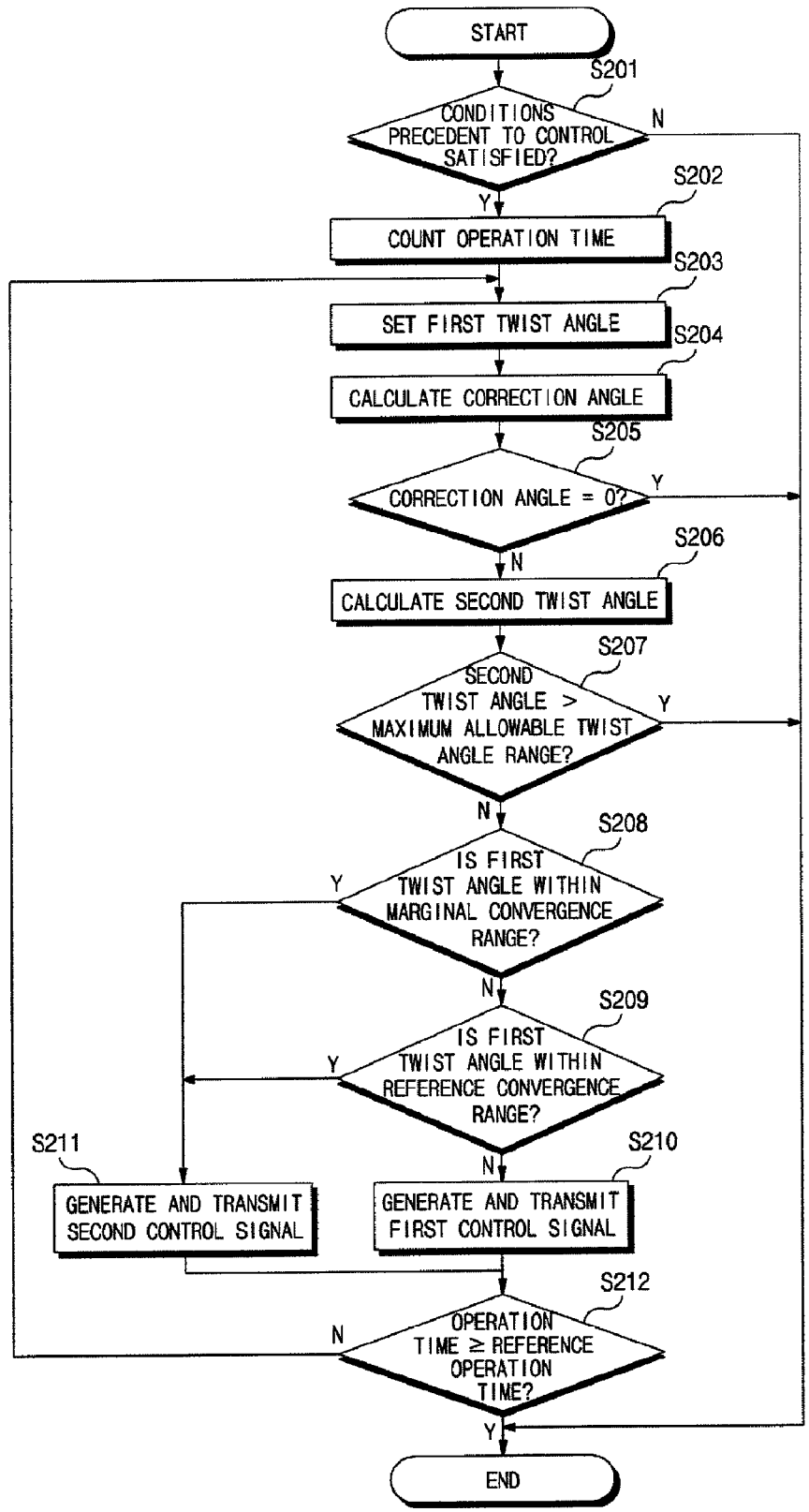
FIG. 20 is a flowchart illustrating a step of generating a control signal according to a re-leveling mode adopted in a leveling control method for heavy equipment as illustrated in FIG. 14.
Figure 21:
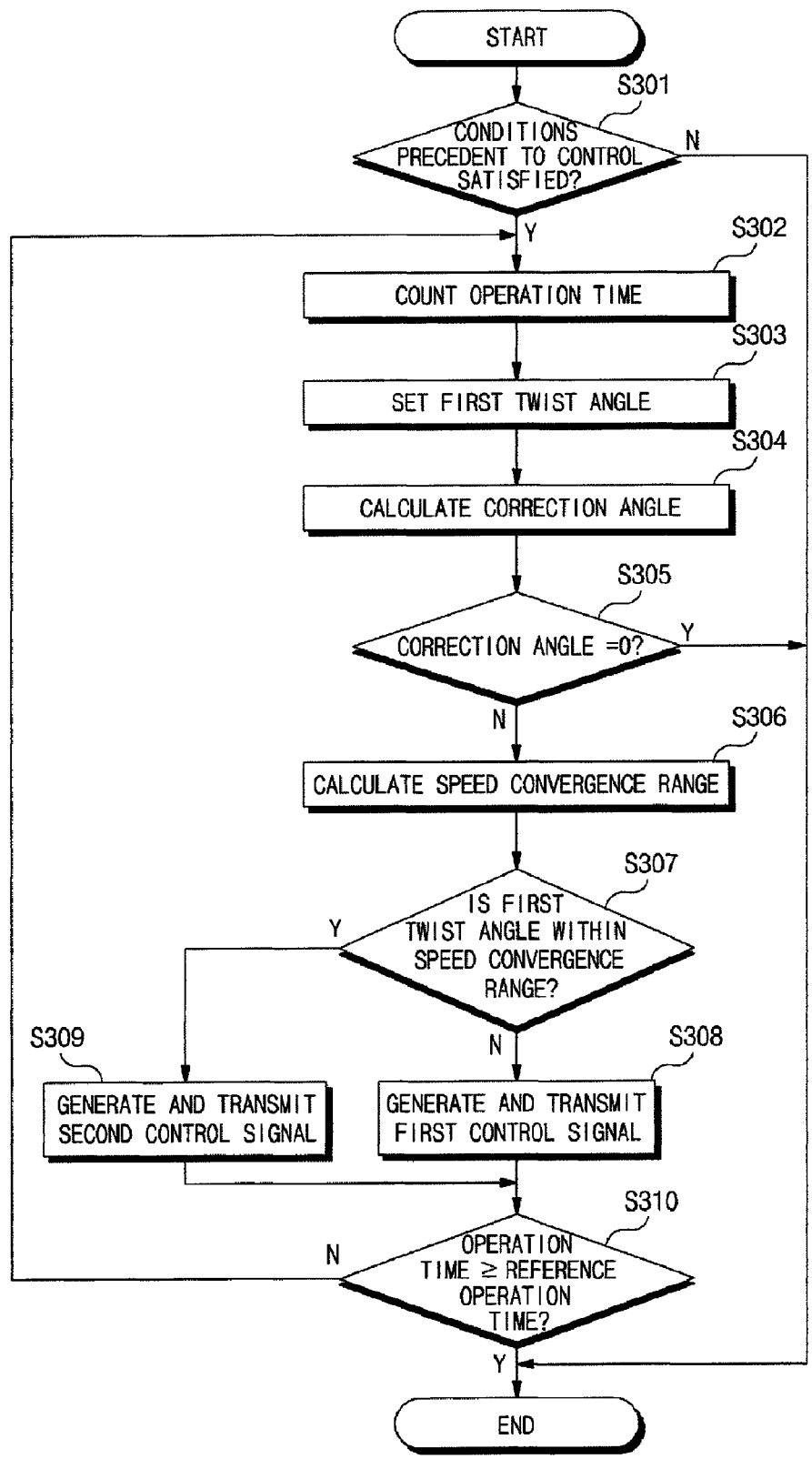
FIG. 21 is a flowchart illustrating a step of generating a control signal according to a track leveling mode adopting in a leveling control method as illustrated in FIG. 14.

That is, the divided generation of the first and second control signals for controlling the operation speed of the actuators, as illustrated in FIG. 13, is performed in a case where the first twist angle 201 approaches the twist angle 202 of the lower frame and in the case where the first twist angle 201 does not approach the twist angle 202 of the lower frame.

In this case, the detailed conditions for generating the second control signal are as follows.

If the first twist angle 201 is converged into a predetermined range of the twist angle 202 of the lower frame, the control signal being generated is changed from the first control signal to the second control signal. For this, the predetermined range (hereinafter referred to as "speed convergence range) of the twist angle 202 of the lower frame is determined by the following condition 9.

Twist Angle of Lower Frame−Constant Angle≦Speed Convergence Range≦Twist Angle of Lower Frame+Constant Angle   (Condition 9)

Here, the constant angle 207 is an angle in a speed reduction region determined by user's optional setting, and the twist angle of the lower frame on the condition 9 has an angle value obtained by adding the weight angle to the twist angle of the lower frame if the weight value is not 0°. That is, if the first twist angle 201 converges into the range of "Twist Angle of Lower Frame±Constant Angle", the second control signal for operating the actuator at low speed is generated.

On the other hand, the output module 45 transmits the display signal to the display unit 30, and transmits the control signal (or the first control signal or the second control signal) to the driving unit.

The time limit module 46 is activated when the heavy equipment is in a standstill state in the auto leveling mode, in the re-leveling mode, and in the track leveling mode, and limits a tilting control performance time.

More specifically, if the lower frame is in a traveling state in the auto leveling mode (i.e. the traveling speed is not "0"), the time limit module 46 is not activated, and the leveling control of the equipment is performed without limiting the operation time. If the traveling lower frame is stopped, i.e. is in a standstill state (in this case, the traveling speed is "0"), the time limit module 46 is activated. In this case, the tilting control of the upper frame is performed within the predetermined reference operation time, and after the reference operation time, the corresponding tilting control is terminated. Thereafter, if the manual mode is activated, the user can manually perform the leveling of the upper frame using the posture controller 13.

On the other hand, the re-leveling mode and the track leveling mode are immediately activated, and thereafter, the corresponding tilting control is performed only for the reference operation time.

Even in a state where the heavy equipment is in a standstill state, the first twist angle is continuously changed and sensed due to vibration caused by the working or vibration of the heavy equipment itself, and thus the time limit module 46 is to compulsorily terminate the tilting control of the upper frame after the lapse of the predetermined time, so that the user can perform a precise work.

On the other hand, if an emergency, in which a normal tilting control is not performed, occurs due to an abnormal state of the sensor or the output of the driving unit during the tilting control, user's direct participation in the control process may be taken through the following construction. The control unit 40 may further include an emergency stop module 47 for stopping the tilting control by judging whether an emergency stop condition is satisfied.

In the auto leveling mode, the emergency stop condition is judged by whether the control lock lever is activated, whether the posture controller is varied, whether the auto leveling mode switch is turned off, whether the working device is in an operation state, whether the re-leveling mode switch is turned on, or whether the track leveling mode switch is turned on. That is, while the user performs an auto leveling control by activating the auto leveling mode switch and observes the leveling control process through the display unit 30 and so on, the user can intervene in the corresponding auto leveling mode through activation of the control lock lever, variation of the posture controller, e.g. activation of the manual leveling mode, turn-off of the auto leveling mode switch, activation of the working device, activation of the re-leveling mode by turning on the re-leveling mode switch, or activation of the track leveling mode by turning on the track leveling mode switch.

In this case, the emergency stop module 47 recognizes the activation of the control lock lever 12 inputted from the user, the input of a tilting command according to the variation of the posture controller, the turn-off of the auto leveling mode switch, the input of a working state signal of the working device, or the turn-on of the re-leveling mode switch, and immediately terminates the tilting control.

On the other hand, in the re-leveling mode, the emergency stop condition is judged by whether the control lock lever is activated, whether the posture controller is varied, whether the re-leveling mode switch is turned off, whether the working device is in an operation state, whether the auto leveling mode switch is turned on, or whether the track leveling mode switch is turned on. That is, in the case where the re-leveling mode is in an active state, the emergency stop module recognizes the activation of the control lock lever, the input of a tilting command according to the variation of the posture controller, the turn-off of the re-leveling mode switch, the input of a working state signal of the working device, the turn-on of the auto leveling mode switch, or the turn-on of the track leveling mode switch, and terminates the re-leveling mode. If the previous mode, which is the track leveling mode, is activated after the termination of the re-leveling mode, the manual leveling mode is activated.

On the other hand, in the track leveling mode, the emergency stop condition is judged by whether the control lock lever is activated, whether the posture controller is varied, whether the track leveling mode switch is turned off, whether the working device is in an operation state, whether the auto leveling mode switch is turned on, or whether the re-leveling mode switch is turned on. That is, in the case where the track leveling mode is in an active state, the emergency stop module recognizes the activation of the control lock lever, the input of a tilting command according to the variation of the posture controller, the turn-off of the track leveling mode switch, the input of a working state signal of the working device, the turn-on of the auto leveling mode switch, or the turn-on of the re-leveling mode switch, and terminates the track leveling mode. After the track leveling mode is terminated, the previous mode is activated.

Hereinafter, a leveling control method for heavy equipment according to an embodiment of the present invention will be described in detail with reference to the accompanying drawings.

The auto leveling mode, the re-leveling mode, the track leveling mode, and the manual mode are in exclusive relations. If one mode is selected and activated, other modes are inactivated. If the auto leveling mode, the re-leveling mode, or the track leveling mode is activated, the automatic leveling of the upper frame is performed unless the emergency stop condition is satisfied through the user's intervention and so on.

For this, the leveling control method for heavy equipment according to an embodiment of the present invention includes a sensing step s1, a control signal generation step s2, and a driver operation step s3.

More specifically, in the auto leveling mode, the re-leveling mode, or the track leveling mode, the leveling control method for heavy equipment in which a lower frame having a traveling means and an upper frame are combined together by a tilting means that includes a sensor unit, a control unit, and a driving unit, includes the steps of (A) the sensor unit sensing twist angles (i.e. pitching angles and rolling angles) of the lower frame and the upper frame against a reference horizontal surface from inclination sensors mounted on the lower frame and the upper frame, a traveling speed of the heavy equipment, and a working state of a working device 100 in the form of electric signals (s1); (B) the control unit generating control signals of actuators for performing a tilting control of the upper frame based on the twist angles and the traveling speed, and transmitting the control signals to the driving unit (s2); and (C) the driving unit performing the tilting control by operating the actuators based on the control signals (s3). Thereafter, within a limited range of an operation time, the corresponding tilting control is repeatedly performed.

<Description of the Auto Leveling Control Method>

The step (B) of the leveling control method for heavy equipment according to the auto leveling mode will be described in more detail.

Step (b11) judges whether conditions precedent to control are satisfied, and if the conditions precedent to control are not satisfied, it terminates the leveling control (s101).

In this case, the conditions precedent to control are determined based on the input state of the input unit. Specifically, whether the conditions precedent to control are satisfied is judged by independently judging whether the control lock lever is in an active state, whether the posture controller is in a center position, and whether the equipment is in a traveling state. If all the conditions, including an inactive state of the control lock lever, a location of the posture controller in the center, an on state of the auto leveling mode switch, and the traveling state of the heavy equipment, are satisfied, it is judged that the conditions precedent to control are satisfied, and the next step is performed. If any one of the above-described conditions is not satisfied, the corresponding auto leveling mode is terminated, and the auto leveling mode switch is turned off. At this time, if the traveling speed sensed by the traveling sensor is not "0", the equipment is in a traveling state, while if the traveling speed is "0", the equipment is in a standstill state.

Step (b12) sets the sensed twist angle of the upper frame as the first twist angle (s102) if the conditions precedent to control are satisfied in step (b11). Then, the step (b12) judges whether the basis of the correction angle is the reference angle, the maximum allowable upper limit twist angle range, or the maximum allowable lower limit twist angle range, and calculates the correction angle accordingly (S103).

The correction angle is calculated through the next steps (b101) to (b103) using the twist angle of the lower frame, the reference angle, the maximum allowable lower limit angle range, the maximum allowable upper limit twist angle range, and the first twist angle as selective parameters.

Step (b101) judges whether the condition "Reference angle<Twist angle of lower frame−Maximum allowable lower limit twist angle range" is satisfied, and if the condition is satisfied, it computes the correction angle as "Twist angle of lower frame−Maximum allowable lower limit twist angle range−First twist angle" (s118 and s122).

Step (b102) judges whether the condition "Reference angle≦Twist angle of lower frame+Maximum allowable upper limit twist angle range" is satisfied if the reference angle condition in step (b101) is not satisfied, and if the condition is satisfied, it computes the correction angle as "Reference angle−First twist angle" (s119 and s121).

Step (b103) computes the correction angle as "Twist angle of lower frame+Maximum allowable upper limit twist angle range−First twist angle" if the reference angle condition in step (b102) is not satisfied (s120).

If the correction angle calculated in step (b12) is "0", the current target of tilting control is satisfied. In this case, step (b13) returns to step (b12) and continuously checks whether the tilting control of the upper frame is required until the traveling is stopped or until the emergency stop condition is satisfied as described above (s104).

If the correction angle is not "0", step (b13) calculates the second twist angle by the above-described condition 1, and compares the second twist angle with the maximum allowable twist angle range. If the second twist angle gets out of the maximum allowable twist angle range, the tilting control cannot be performed, and thus the corresponding tilting control is terminated (s105 and s106).

Step (b14) generates a control signal for controlling the actuators for tilting in accordance with the correction angle and the second twist angle if the second twist angle is within the maximum allowable twist angle range, and transmits the control signal to the driving unit (s107).

In this case, step (b14) generates the first and second control signals for operating the actuators at different speeds in order to protect cylinders of the actuators or the user. For this, the generation of the control signal is subdivided into the following steps.

Step (b201) compares the first twist angle with the marginal convergence range, and if the first twist angle is out of the marginal convergence range, it compares the first twist angle with the reference convergence range (s123 and s124).

If the first twist angle is out of the reference convergence range in step (b201), there is an extra space in the operation region of the cylinder of the actuator, and thus step (b202) generates the first control signal for operating the actuators at normal speed (s125).

If the first twist angle is within the marginal convergence range or within the reference convergence range in step (b201), step (b203) generates the second control signal for operating the actuators at low speed (s126). That is, as described above, if the second twist angle is within the marginal convergence range, the second control signal is generated to protect the cylinder in the operation limit region. Also, if the first twist angle is within the reference convergence range, the second control signal is generated to protect the user from an abrupt impact.

Step (b15) judges whether the equipment is in a traveling state after step (b14), and if the equipment is in a traveling state, it returns to the step (b12), and performs the tilting control of the upper frame until the traveling is stopped or until the emergency stop condition is satisfied (s108).

If the equipment is not in a traveling state, i.e. if the equipment is in a standstill state in step (b15), step (b16) starts counting of the operation time for limiting the tilting control time (s109).

Step (b17) performs the steps (b11) to (b14) after the step (b16) (s110 and s115). However, if the correction angle is 0° in step (b13), the target of tilting control is satisfied, and thus the corresponding tilting control is terminated (s112). In addition, after performing the step (b14), step (b17) judges whether the equipment is in a traveling state, and if the equipment is in a traveling state, it returns to the step (b12) in which the tilting control signal is not limited, and performs the tilting control of the upper frame until the traveling is stopped or until the emergency stop condition is satisfied (s116).

Step (b18) terminates the corresponding tilting control if the operation time becomes equal to or exceeds the reference operation time optionally set by the user in a state that the equipment is not in a traveling state (i.e. the equipment is in a standstill state) in step (b17), and returns to the step (b17) if the operation time is less than the reference operation time (s117). That is, if the correction angle becomes 0° within the reference operation time and the target of tilting control is achieved, or until the emergency stop condition is satisfied, the tilting control of the upper frame is performed.

<Description of the Re-Leveling Control Method>

The step (B) of the leveling control method for heavy equipment according to the re-leveling mode will be described in more detail.

Step (b21) judges whether the conditions precedent to control are satisfied, and if the conditions precedent to control are not satisfied, it terminates the leveling control (s101).

In this case, the conditions precedent to control are judged by independently judging whether the control lock lever is in an active state, whether the posture controller is in a center position, and whether the working device is in an operation state. If all the conditions, including an inactive state of the control lock lever, a location of the posture controller in the center, an on state of the auto leveling mode switch, and the traveling state of the heavy equipment, are satisfied, it is judged that the conditions precedent to control are satisfied, and the next step is performed. If any one of the above-described conditions is not satisfied, the corresponding re-leveling mode is terminated, and the re-leveling mode switch is turned off.

Thereafter, if the previous mode, which is the track leveling mode, is activated, the manual mode is activated.

Step (b22) starts counting of the operation time for limiting the auto leveling time of the heavy equipment according to the re-leveling mode (s202) if the conditions precedent to control are satisfied in step (b21).

Then, step (b23) sets the twist angle of the upper frame sensed after the step (b22) as the first twist angle, judges whether the basis of the correction angle is the reference angle, the maximum allowable upper limit twist angle range, or the maximum allowable lower limit twist angle range, and calculates the correction angle accordingly (S203 and s204).

At this time, the correction angle is calculated through the steps (b101) to (b103) of the auto leveling mode as described above by using the twist angle of the lower frame, the reference angle, the maximum allowable lower limit angle range, the maximum allowable upper limit twist angle range, and the first twist angle as selective parameters.

If the correction angle calculated in step (b23) is 0°, the current target of tilting control is satisfied. In this case, step (b24) terminates the corresponding tilting control (s205).

If the correction angle is not "0", step (b24) calculates the second twist angle by the above-described condition 1, and compares the second twist angle with the maximum allowable twist angle range. If the second twist angle gets out of the maximum allowable twist angle range, the tilting control cannot be performed, and thus the corresponding tilting control is terminated.

If the second twist angle is within the maximum allowable twist angle range in step (b24), step (b25) generates control signals for controlling the actuators for tilting in accordance with the correction angle and the second twist angle, and transmits the control signal to the driving unit (s202 to s211).

In this case, step (b25) may generate the first and second control signals for operating the actuators at different speeds in the same manner as the leveling control method according to the auto leveling mode as described above. Since the generation of the control signal is the same as the generation of the first and second control signals in the auto leveling mode as described above, the duplicated description thereof will be omitted.

Step (b26) compares the operation time with a reference operation time preset by the user after step (b25), and if the operation time exceeds the reference operation time, it terminates the corresponding tilting control. If the operation time is less than the reference operation time, step (b26) returns to step (b23). That is, if the correction angle becomes 0° within the reference operation time and the target of the tilting control is accomplished, or until the emergency stop condition is satisfied, the tilting control of the upper frame is performed (s212).

<Description of the Track Leveling Control Method>

The step (B) of the leveling control method for heavy equipment according to the track leveling mode will be described in more detail.

Step (b31) judges whether the conditions precedent to control are satisfied, and if the conditions precedent to control are not satisfied, it terminates the leveling control (s101), while if the conditions precedent to control are satisfied, it starts counting of the operation time for limiting the tilting control time (s301 and s302).

In this case, it is considered that the conditions precedent to control are satisfied in the case where the control lock lever is in an inactivate state, the posture controller is positioned in the center, the working device is not in a working state, the twist angle of the lower frame is within an optionally selected allowable angle range, and the traveling means is not in a traveling state. Here, in tilting the upper frame to be parallel to the lower frame, the allowable angle range is the twist angle of the lower frame preset by the user for a safe track leveling. This is because, if the slope of the ground, on which the lower frame is put, is steep, the center of gravity of the heavy equipment is moved by the track leveling, and thus overturning of the heavy equipment may occur.

Then, step (b32) sets the twist angle of the upper frame sensed after the step (b31) as the first twist angle (s303), and calculates the twist angle of the lower frame and the correction angle for tilting the upper frame from the first twist angle by using the condition 6 on the assumption that the user does not set the weight angle, i.e., the weight angle is set to 0° (s304).

Thereafter, step (b32) judges whether the correction angle is 0°, and if the correction angle is 0°, it terminates the tilting control since the leveling target against the lower frame is satisfied.

If the correction angle is not 0° in the step (b32), step (b33) calculates the operation region of the actuator for pitching or rolling the upper frame based on the correction angle, generates a control signal for the actuator, and transmits the generated control signal to the driving unit.

At this time, in order to calculate the operation region of the actuator, step (b33) calculates the second twist angle by the condition 1, estimates the position of a piston of the actuator based on the current second twist angle, and sets the estimated position as an initial value for calculating the operation region.

The control signal may be divided into the first and second control signals for operating the actuators at different speeds. The first and second control signals are generated through the following steps.

Step (b33) compares the first twist angle with the speed convergence range calculated according to the condition 9, and if the first twist angle is within the speed convergence range, it generates the second control signal for operating the actuator at low speed, in order to protect the user from the impact caused by an abrupt stop of the actuator. If the first twist angle gets out of the speed convergence range, step (b33) generates the first control signal for being limited in operation speed of the actuator, i.e. for operating the actuator at normal speed (s306 to s309).

Step (b34) compares the operation time with the reference operation time preset by the user after step (b33), and if the operation time is equal to or exceeds the reference operation time, it returns to step (b32), and continues the tilting control of the upper frame when the correction angle becomes 0° or until the emergency stop condition set by the user is satisfied (s310).

<Description of the Manual Control Method>

When the manual mode is activated, the user can input values for tilting through an input device (e.g. a joystick). If it is assumed that the joystick is in its center position in the case where the user does not manipulate the joystick, the input values are divided into an input angle value which increases in a clockwise direction, starting from the front side of the user, i.e., the front part of the upper frame, and an input size value at the center point.

The control unit determines the operation direction (e.g. expansion or contraction) of the respective actuator for making a corresponding part of the upper frame descend, which has the same angle as the input angle, in accordance with the input angle, and calculates the displacement length of the respective actuator in accordance with the input size to operate the respective actuator accordingly.

For example, if the user puts the joystick at a position having a length that is half the entire displaceable length in a direction of +30°, a part of the upper frame in the direction of +30° descends as much as half the marginal convergence range, while the opposite part of the upper frame in the direction of +210° ascends as much as half the marginal convergence range, so that the tilting of the upper frame is performed in accordance with the user's intention.

<Description of the Emergency Stop Condition>

In addition, the leveling control process according to the auto leveling mode, the re-leveling mode, or the track leveling mode is immediately terminated when the emergence stop condition set by the user's manipulation of the input unit 10 is satisfied.

The emergency stop condition in the auto leveling mode is satisfied in the case where the control lock lever is activated according to a user's input, a tilting command is inputted by varying the posture controller, an auto leveling mode switch is turned off, or the working device is in an operation state. If the emergency stop condition is satisfied, a stop command is transmitted from the emergency stop module to the respective modules, so that the corresponding tilting control is terminated, and the manual mode is activated.

The emergency stop condition in the re-leveling mode is satisfied in the case where the control lock lever is activated according to the user's input, the posture controller is varied, a re-leveling mode switch is turned off, the working device is in an operation state, an auto leveling mode switch is turned on, or a track leveling mode switch is turned on. If the emergency stop condition is satisfied, the corresponding tilting control is terminated, and the previous leveling mode is activated. In this case, if the previous leveling mode is the track leveling mode, the manual mode is activated.

On the other hand, the emergency stop condition in the track leveling mode is satisfied in the case where the control lock lever is activated, the posture controller is varied, a track leveling mode switch is turned off, the working device is in an operation state, an auto leveling mode switch is turned on, or a re-leveling mode switch is turned on.

As described above, according to the leveling control system and method for heavy equipment according to the embodiments of the present invention, the leveling work that is required at all times is automatically performed in operating the heavy equipment on an inclined site, and thus an operator's convenience in operation is increased.

In addition, since the leveling control is performed based on the reference horizontal surface and the lower frame, the automatic leveling of the upper frame can be performed not only when the equipment travels but also when the equipment is loaded on a transport means.

In addition, a user can directly stop the tilting control by inputting an emergency stop condition during the tilting control process, and thus the stability in use is increased.

In addition, since first and second control signals for adjusting the operation speed are selectively generated in accordance with the degree of the tilting control, the tilting means is prevented from being damaged, and the user is protected from an abrupt impact.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A leveling control system for controlling automatic leveling of heavy equipment with a lower frame and an upper frame, the lower frame having traveling means, and the upper frame tiltably and swingably connected to the lower frame, the leveling control system comprising:

a sensor unit, provided in the equipment, for measuring twist angles of the lower frame and the upper frame against a reference horizontal surface and a traveling speed of the equipment, and detecting working state information of working devices;

a control unit for receiving the twist angles, the traveling speed, and the working state information, calculating a correction angle for the leveling control of the upper frame, and generating a control signal for instructing an operation of an actuator in accordance with the correction angle, the control unit including an auto leveling mode module for performing the leveling against a reference horizontal surface, a re-leveling mode module for performing the leveling against the reference horizontal surface in a standstill state of the equipment for a limited time, and a track leveling mode module for performing the leveling against the lower frame; and a driving unit for performing the leveling through the actuator in accordance with the control signal received therein;

wherein the control unit comprises:

a receiving module for receiving the twist angles against a reference horizontal surface, the traveling speed, and the working state information from the sensor unit;

a correction angle calculation module for setting the twist angle of the upper swing structure as a first twist angle, and calculating the correction angle, at which the upper swing structure is to be rotated, based on the first twist angle;

a control signal generation module for generating the control signal in accordance with a region, in which the actuator is to be operated, based on the correction angle;

an output module for transmitting the control signal to the driving unit;

a time limit module for counting an operation time in a standstill state of the lower frame, comparing the counted operation time with a predetermined reference operation time, and terminating the leveling control if the operation time is more than the reference operation time; and a display signal generation module for generating a display signal for displaying the twist angles of the lower frame and the upper swing structure through a display unit provided with an image display device.

2. The system of claim 1, wherein the control unit further comprises an emergency stop module for immediately terminating the leveling control if an emergency stop condition is satisfied in the auto leveling mode, the re-leveling mode, or the track leveling mode.

3. The system of claim 1, wherein, if the auto leveling mode or the re-leveling mode is activated, the correction angle calculation module calculates the correction by calculating "twist angle of lower frame−maximum allowable lower limit twist angle range−first twist angle" in the case where the reference angle is "reference angle<twist angle of lower frame−maximum allowable lower limit twist angle range";

calculating "reference angle−first twist angle" in the case where the reference angle is "twist angle of lower frame−maximum allowable lower limit twist angle range≦reference angle≦twist angle of lower frame+maximum allowable upper limit twist angle range"; and calculating "twist angle of lower frame+maximum allowable upper limit twist angle range−first twist angle" in the case where the reference angle is "twist angle of lower frame+maximum allowable upper limit twist angle range<first twist angle".

4. The system of claim 1, wherein the correction angle is calculated by calculating "twist angle of lower frame−first twist angle" through the correction angle calculation module if the track leveling mode is activated.

5. The system of claim 4, wherein the correction angle is calculated by calculating "twist angle of lower frame+weight angle−first twist angle" if the weight angle is set.

6. The system of claim 1, wherein, in the auto leveling mode or the re-leveling mode, the control signal is generated by the control signal generation module in a manner that, if the first twist angle is within a marginal convergence range or within a reference convergence range, a second control signal for operating the actuator at low speed is generated, and if the first twist angle is out of the marginal convergence range and the reference convergence range, a first signal that does not limit the operation speed of the actuator is generated; and wherein the marginal convergence range is calculated through "twist angle of lower frame−maximum allowable lower limit twist angle range marginal convergence range≦twist angle of lower frame−maximum allowable lower limit twist angle range+constant angle" or "twist angle of lower frame+maximum allowable upper limit twist angle range−constant angle≦marginal convergence range≦twist angle of lower frame+maximum allowable upper limit twist angle range"; and the reference convergence range is calculated through "reference angle−constant angle reference convergence angle reference angle+constant angle".

7. The system of claim 1, wherein, in the track leveling mode, the control signal is generated by the control signal generation module in a manner that, if the first twist angle is within a speed convergence range, a second control signal for operating the actuator at low speed is generated, and if the first twist angle is out of the speed convergence range, a first control signal that does not limit the operation speed of the actuator is generated; and wherein the speed convergence range is calculated through "twist angle of lower frame−constant angle speed convergence range twist angle of lower frame+constant angle".

* * * * *